United States Patent
Sakurai et al.

(10) Patent No.: US 9,489,324 B2
(45) Date of Patent: Nov. 8, 2016

(54) DATA PROCESSING DEVICE, SEMICONDUCTOR EXTERNAL VIEW INSPECTION DEVICE, AND DATA VOLUME INCREASE ALLEVIATION METHOD

(71) Applicant: Hitachi High-Technologies Corporation, Minato-ku, Tokyo (JP)

(72) Inventors: Yuichi Sakurai, Tokyo (JP); Tadanobu Toba, Tokyo (JP); Ken Iizumi, Tokyo (JP); Katsunori Hirano, Tokyo (JP); Hideki Osaka, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 322 days.

(21) Appl. No.: 14/364,371

(22) PCT Filed: Nov. 1, 2012

(86) PCT No.: PCT/JP2012/078370
§ 371 (c)(1),
(2) Date: Jun. 11, 2014

(87) PCT Pub. No.: WO2013/140656
PCT Pub. Date: Sep. 26, 2013

(65) Prior Publication Data
US 2014/0372656 A1 Dec. 18, 2014

(30) Foreign Application Priority Data
Mar. 23, 2012 (JP) .................................. 2012-068221

(51) Int. Cl.
*G06F 13/16* (2006.01)
*G06T 1/20* (2006.01)
*G06F 13/36* (2006.01)

(52) U.S. Cl.
CPC .......... *G06F 13/1673* (2013.01); *G06F 13/36* (2013.01); *G06T 1/20* (2013.01)

(58) Field of Classification Search
CPC ...... G06F 13/1673; G06F 13/36; G06T 1/20
See application file for complete search history.

(56) References Cited

U.S. PATENT DOCUMENTS

| 8,266,361 B1* | 9/2012 | Jikku | G06F 13/1673 365/185.11 |
| 8,670,309 B2* | 3/2014 | Atkinson | H04L 47/10 370/230 |
| 2003/0120802 A1* | 6/2003 | Kohno | H04L 29/06 709/237 |
| 2004/0223504 A1* | 11/2004 | Wybenga | H04L 45/60 370/412 |
| 2013/0073773 A1* | 3/2013 | Matsuda | G06F 13/36 710/309 |
| 2013/0083830 A1* | 4/2013 | Locke | H04L 1/1822 375/222 |

FOREIGN PATENT DOCUMENTS

JP 2009-181203 A 8/2009

* cited by examiner

*Primary Examiner* — Glenn A Auve
(74) *Attorney, Agent, or Firm* — Miles & Stockbridge P.C.

(57) ABSTRACT

Provided is a data processing device with which, when a temporary network congestion occurs, it is possible to avoid a buffer overflow and sustain a process. When a request for retransmission of the same data with respect to a processor element from a buffer occurs continuously a prescribed number of iterations, a data processing device according to the present invention determines that it is possible that a buffer overflow occurs, and suppresses an increase in the volume of data which is accumulated in the buffer (see FIG. 1).

12 Claims, 22 Drawing Sheets

→ To Figure 8

← from Figure 8

DATA PROCESSING DEVICE, SEMICONDUCTOR EXTERNAL VIEW INSPECTION DEVICE, AND DATA VOLUME INCREASE ALLEVIATION METHOD

TECHNICAL FIELD

The present invention relates to a device that processes data.

BACKGROUND ART

Patent Literature 1 listed below describes a background technique in the technical field. The document describes as a technical problem that a bus arbitration device is obtained which can perform real-time processes within a predetermined duration, as well as which can secure data communication performance without unnecessarily increasing data access amounts with respect to shared memories when real-time processes are performed. The document further describes as a solution to the problem that, when real-time processes are performed, a priority for accessing a shared memory 15 of a CPU 11 is configured to be higher than that when non-real-time processes are performed, and that if the priority of the CPU 11 is high, a bus arbitration is performed so that the maximum burst length for accessing the shared memory 15 is configured to be shorter than that in normal cases (refer to the abstract).

CITATION LIST

Patent Literature

Patent Literature 1: JP Patent Publication (Kokai) 2009-181203 A

SUMMARY OF INVENTION

Technical Problem

The Patent Literature 1 describes that the bus arbitration device in the document can perform, within a predetermined duration, data transmission within a certain duration or processes that are required to be performed on a real-time basis. Such a bus arbitration device may cause, for example, a buffer overflow due to decrease in network throughput when temporal network congestion occurs. However, the bus arbitration device in the document does not disclose configurations for detecting such network congestions.

The present invention is made in terms of such problems, and provides a data processing device that can prevent buffer overflows to continue processes when temporal network congestion occurs.

Solution to Problem

When data retransmission requests from a buffer to a processor element with respect to the same data occur a predetermined number of times consecutively, a data processing device according to the present invention determines that the buffer may overflow, and suppresses increase in data size stored in the buffer.

Advantageous Effects of Invention

With a data processing device according to the present invention, it is possible to detect temporal network congestions when such congestions occur, thereby suppressing buffer over flows.

DESCRIPTION OF EMBODIMENTS

Embodiment 1

Figure 1:
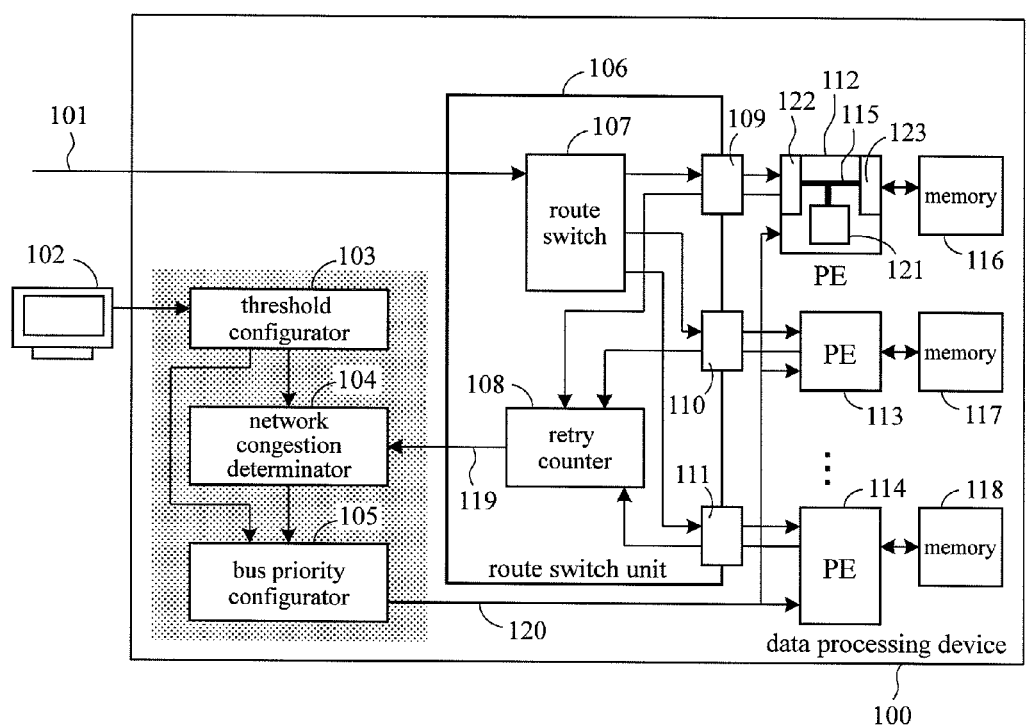
FIG. 1 is a configuration diagram of a data processing device 100 according to an embodiment 1.

FIG. 1 is a configuration diagram of a data processing device 100 according to an embodiment 1 of the present invention. The data processing device 100 is a device that processes process data 101. The data processing device 100 includes a threshold configuration GUI (Graphical User Interface) 102, a threshold configurator 103, a network congestion determinator 104, a bus priority configurator 105, a route switch unit 106, Processor Elements (hereinafter, referred to as PE) 112-114, and memories 116-118.

The figure shows three units of the PEs 112-114, the memories 116-118, and buffers 109-111 described later, for the sake of convenience of description. However, the number of these functional units is not limited to it. Hereinafter, the n-th PE will be described as PE 114, the n-th memory will be described as memory 118, and the n-th buffer will be described as buffer 111.

The process data 101 is data that is outputted uninterruptedly and continuously to the data processing device 100. Thus the process data 101 has to be transmitted to the data processing device 100 with a constant throughput, and it is not allowed to interrupt the receiving process during the data processing device 100 is receiving the process data 101. An example of the process data 101 is sensor data that is continuously outputted from a sensor or output data that is outputted along with movement of machines.

The route switch unit 106 is a switch that distributes the process data 101 to one of the PE 112, 113, and 114. The route switch unit 106 includes a route switch 107, a retry counter 108, and the buffers 109, 110, and 111.

The route switch 107 extracts a destination ID described in a packet header of the process data 101, and searches a switch table in the route switch 107 to identify the buffers 109-111 associated with the destination ID. The route switch 107 transmits the process data 101 to one of the buffers 109-111 corresponding to the identified number.

The buffers 109-111 buffer the received process data 101 using, for example, FIFO (First-In-First-Out) scheme. The buffers 109-111 are connected to one of the PEs 112-114 on a one-to-one basis. The buffers 109-111 transmit the buffered process data to a network interface 122 of the corresponding PEs 112-114.

When the memories 109-111 receive a retransmission request (retry packet: described later) from the network interface 122 of the PEs 112-114, the retry counter 108 counts the number of the retransmission request and outputs the number as a retry counter value 119 to the network congestion determinator 104.

The memories 116-118 are storage devices into which the PEs 112-114 store data or from which the PEs 112-114 read data. The memories 116-118 are connected to one of the PEs 112-114 on a one-to-one basis.

The PEs 112-114 each include a shared bus 115, a processor core 121, the network interface 122, and a memory interface 123. The shared bus 115 is a data transmission bus shared by the processor core 121, the network interface 122, and the memory interface 123. The network interface 122 sends and receives data between the buffers 109-111. The memory interface 123 sends and receives data between the memories 116-118. The processor core 121 receives the process data 101 through the network interface 122, performs necessary processes, and stores the process data 101 into the memories 116-118 through the memory interface 123. The network interface 122 corresponds to "data input unit". The memory interface 123 corresponds to "data output unit".

Hereinafter, a process flow by which the processor elements 112-114 process the process data 101 will be described assuming that the shared bus 115 is Available and Unavailable, respectively.

(1) When the shared bus 115 is Available (1.1) The network interface 122, after receiving the process data 101, checks the state of the shared bus 115. Since there exists only one of the right to control the shared bus 115 (control right), if one of the network interface 122, the processor core 121, and the memory interface 123 acquires the control right, other functional units cannot acquire the control right. If the network interface 122 acquires the bus control right, for example, the shared bus 115 seems Unavailable to the processor core 121. The shared bus 115 becomes Available only when none of the functional units has acquired the bus control right.

(1.2) The network interface 122 acquires the control right of the shared bus 115 if the shared bus 115 is Available.

(1.3) The network interface 122, after acquiring the control right of the shared bus 115, transmits the process data 101 to the memory interface 123 through the shared bus 115.

(1.4) The memory interface 123, after receiving the process data 101, writes the received process data 101 into the memories 116-118.

(2) When the shared bus 115 is Unavailable (2.1) The process flow until the network interface 122 receives the process data 101 is the same as above, thus omitted.

(2.2) The network interface 122, after receiving the process data 101, checks the state of the shared bus 115. If the processor core 121 has acquired the control right of the shared bus 115 previously, the state of the shared bus 115 may be Unavailable.

(2.3) If the state of the shard bus 115 is Unavailable, the network interface 122 cannot acquire the control right of the shared bus 115, and keeps the process data 101 in a packet buffer of the network interface 122. The packet buffer of the network interface 122 may be able to store, for example, 8 packets.

(2.4) If the processor core 121 is BUSY (high load) and frequently accesses the shared bus 115, the shared bus 115 may keep Unavailable. If the shared bus 115 keeps Unavailable, the packet buffer of the network interface 122 will be FULL (no more capacity).

(2.5) If the packet buffer becomes FULL (no more capacity), the network interface 122 cannot receive the process data 101 transmitted from the buffers 109-111 anymore. If the network interface 122 cannot receive the process data 101 transmitted from the buffers 109-111, in order to prevent packet loss, the network interface 122 sends a retransmission request packet (retry packet) for the non-received packets to the buffers 109-111.

(2.6) The buffers 109-111, when receiving the retry packet, extract the process data 101 in question from a retry buffer other than from a buffer storing the process data 101 in normal cases, and retransmit the extracted process data 101 to the network interface 122. This process is referred to as retry process. The buffers 109-111, when performing retry process, stop reading data from the buffer storing the process data 101 in normal cases.

(2.7) If the shared bus 115 keeps Unavailable, the network interface 122 continuously sends the retransmission request packet (retry packet) to the buffers 109-111.

(2.8) If the buffers 109-111 continuously perform the retry process, the process data 101 is accumulated in the buffer. This is because it is necessary to transmit the process data 101 to the data processing device 100 with a constant throughput as mentioned above, thus it is not allowed to interrupt the transmission while inputting the process data 101 into the data processing device 100.

(2.9) The retry counter 108 counts the number of the retry packet received by the buffers 109-111 for each of the buffers 109-111.

As discussed thus far, the process flow by which the processor elements 112-114 process the process data 101 is described assuming that the shared bus 115 is Available and Unavailable, respectively.

The network congestion determinator 104 reads out, from the retry counter 108, the number of the retry packet received by the buffers 109-111 (the retry counter value 119). The network congestion determinator 104 performs processes described later according to the retry counter value 119.

The bus priority configurator 105, according to the determination result of the network congestion determinator 104, instructs the PEs 112-114 to preferentially use the shared bus 115 included in the PEs 112-114 so that the network interface 122 can receive the process data 101. This prevents the buffers 109-111 from overflowed (buffer overflow) by the subsequent process data 101. The bus priority configurator 105 corresponds to "buffer accumulation suppressor" in the embodiment 1.

Figure 5:
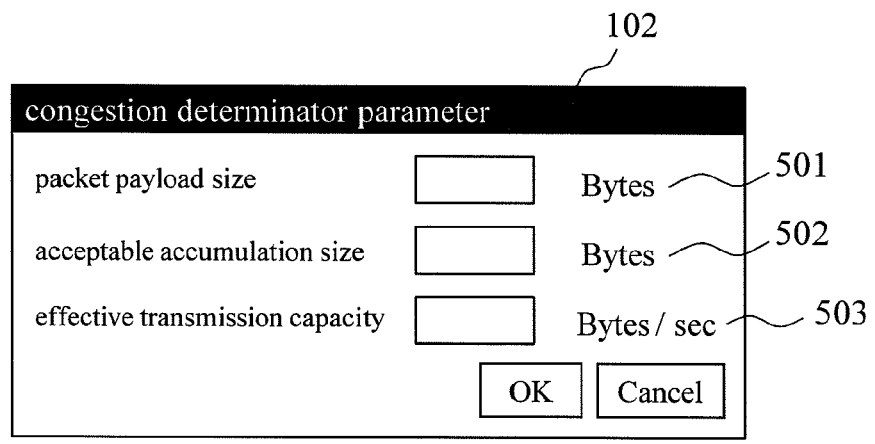
FIG. 5 is a diagram showing a display image of a threshold configuration GUI 102.

The threshold configurator 103 provides the threshold configuration GUI 102 on screen devices such as displays. The threshold configurator 103 configures, according to numeral values inputted on the threshold configuration GUI 102, each threshold described later. FIG. 5 will describe an example of the threshold configuration GUI 102 later.

Figure 2:
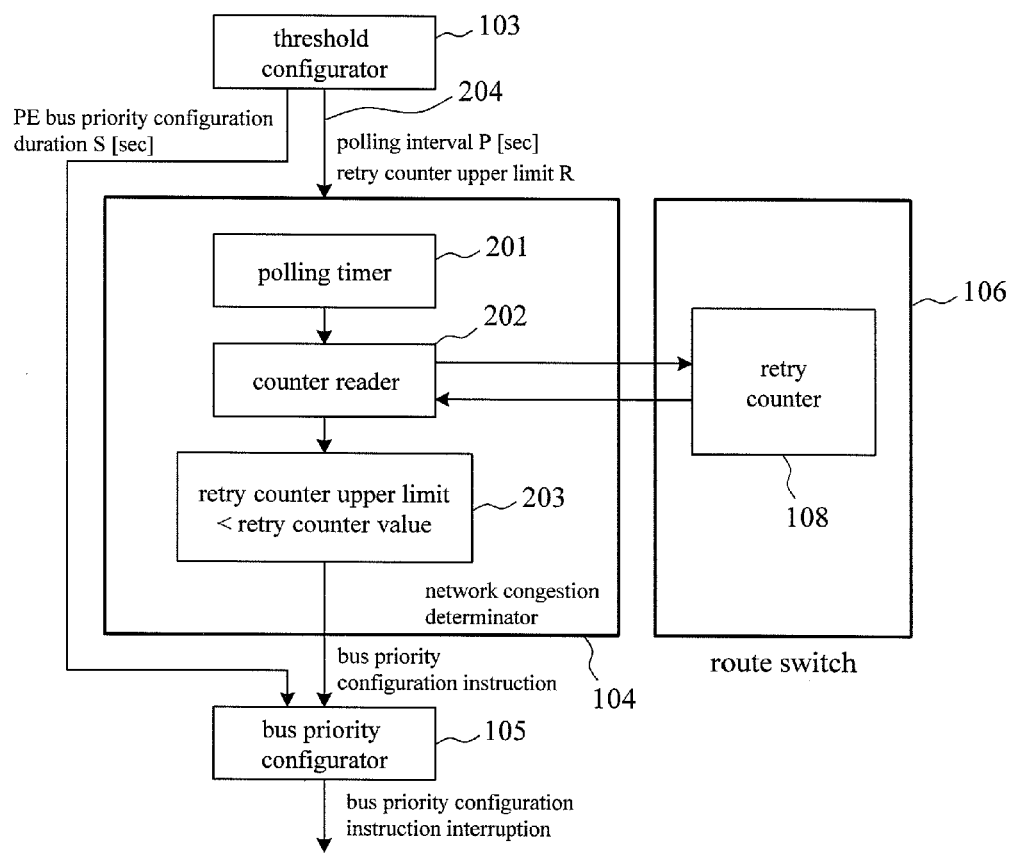
FIG. 2 is a diagram showing a detailed configuration of a network congestion determinator 104.

FIG. 2 is a diagram showing a detailed configuration of the network congestion determinator 104. The network congestion determinator 104 includes a polling timer 201, a counter reader 202, and a determinator 203. The network congestion determinator 104 receives, from the threshold configurator 103, a parameter 204 described hereinafter.

Figure 4:
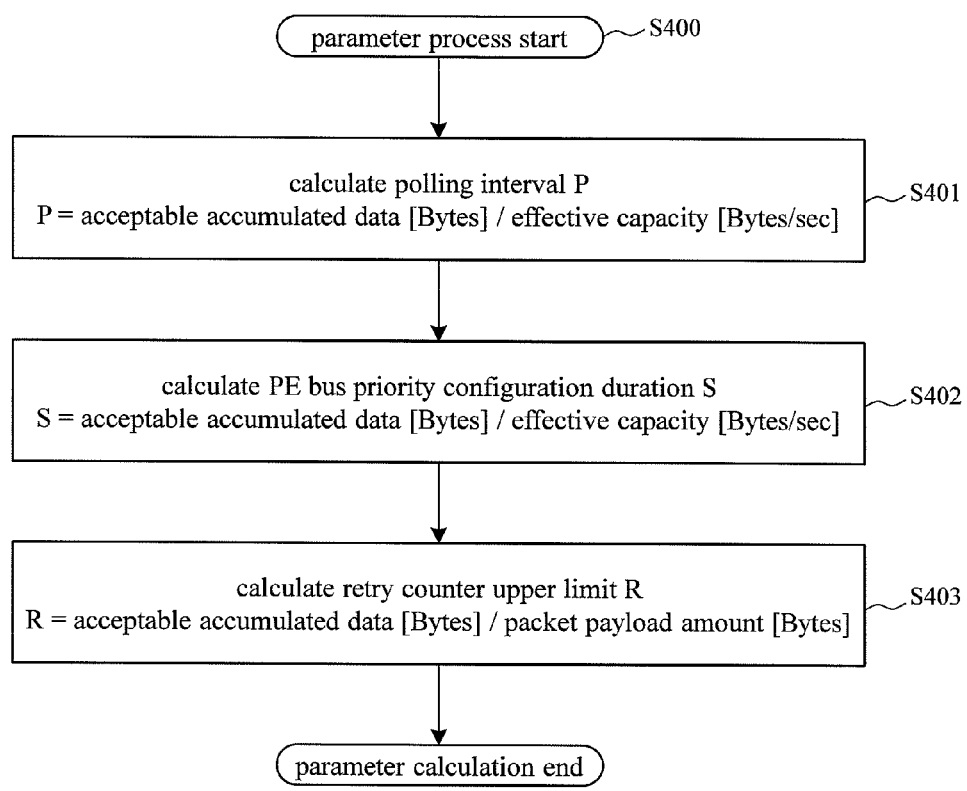
FIG. 4 is a flowchart showing an operation of a threshold configurator 103.

The polling timer 201 launches the counter reader 202 at each of polling intervals P calculated by the threshold configurator 103. FIG. 4 will describe how to calculate the polling interval P.

When receiving a launch instruction from the polling timer 201, the counter reader 202 reads out from the retry counter 108 of the route switch unit 106 the number of the retry packet received by the buffers 109-111 (retry counter value 119).

The determinator 203 compares a retry counter upper limit R calculated by the threshold configurator 103 with the retry counter value read out from the retry counter 108. If the retry counter value read out from the retry counter 108 is larger than the retry counter upper limit R, the determinator 203 determines that network congestion has occurred. Then the determinator 203 outputs a bus priority configuration instruction to the bus priority configurator 105. The bus priority configuration instruction is an instruction to preferentially use the shared bus 105 for receiving the process data 101 during a PE bus priority configuration duration S calculated by the threshold configurator 103. FIG. 4 will describe how to calculate the PE bus priority configuration duration S and to calculate the retry counter upper limit R.

Figure 3:
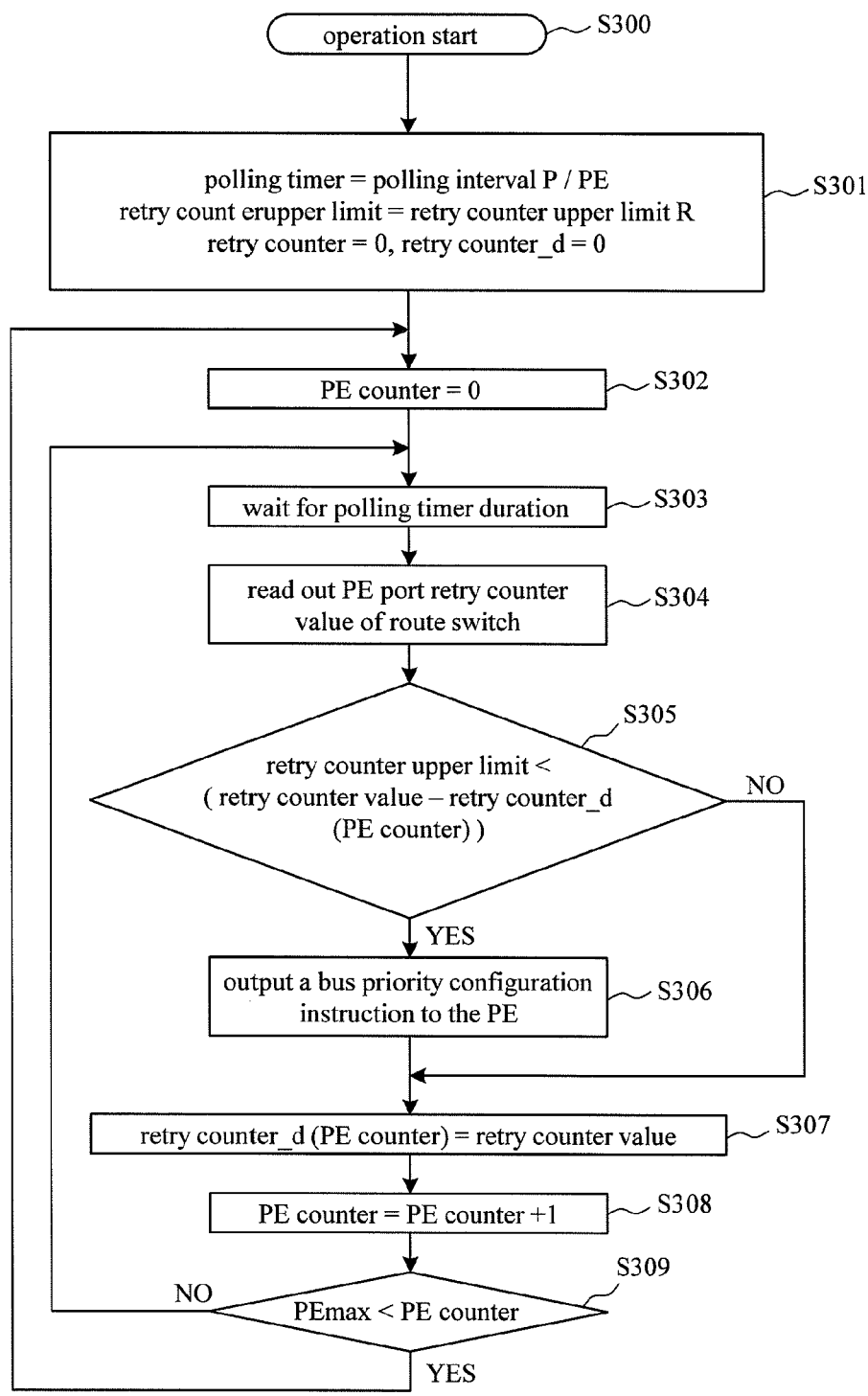
FIG. 3 is a flowchart showing an operation of the network congestion determinator 104.

FIG. 3 is a flowchart showing an operation of the network congestion determinator 104. Hereinafter, each step of FIG. 3 will be described.

In step S300, the network congestion determinator 103 starts the flowchart. This step is initiated at the same time the data processing device 100 is activated, for example.

In step S301, the network congestion determinator 104 calculates each initial value according to each value calculated by the threshold configurator 103 using the procedure described in FIG. 4 later. The polling timer is a value calculated by dividing the polling interval P by the number of PE. The retry counter is a variable storing the retry counter value 119 read out from the retry counter 108. The retry counter_d is a variable storing the retry counter value 119 read out from the retry counter 108 last time.

In step S302, the network congestion determinator 104 clears a PE counter into zero. The PE counter is an index to identify the ID of the PEs 112-114.

In step S303, the network congestion determinator 104 waits for the polling timer interval P.

In step S304, the network congestion determinator 104 reads out, from the retry counter 108 of the route switch 106, the number of the retry packet (retry counter value 119) received by the buffer indicated by the current PE counter.

In step S305, the network congestion determinator 104 compares the retry counter upper limit R calculated by the threshold configurator 103 with a value calculated by subtracting the retry counter value read out last time from the retry counter value read out in step S304. By subtracting the retry counter value read out last time from the retry counter value read out in step S304, the incremental value of the retry counter during the polling interval is calculated. If the former is smaller, the process proceeds to step S306. Otherwise the process skips to step S307.

In step S306, the network congestion determinator 104 outputs a bus priority configuration instruction to the PE indicated by the PE counter. Details of the bus priority configuration instruction will be described later.

In step S307, the network congestion determinator 104 stores the retry counter value read out in step S304 into the retry counter_d. In step S308, the network congestion determinator 104 increments the PE counter by 1.

In step S309, the network congestion determinator 104 compares the total number of PE (Pmax) connected to the route switch unit 106 with the PE counter. If the former is smaller, the network congestion determinator 104 determines that reading the retry counter value is not finished for all of the PEs connected to the route switch unit 106, and then the process returns to step S303. Otherwise the network congestion determinator 104 determines that reading the retry counter value is finished for all of the PEs connected to the route switch 106, and the process returns to step S302.

FIG. 4 is a flowchart showing an operation of the threshold configurator 103. Hereinafter, each step of FIG. 4 will be described.

In step S400, the threshold configurator 103 starts the flowchart. This step is initiated when the OK button on the threshold configuration GUI 102 described in FIG. 5 later is pressed and the threshold configurator 103 receives a signal indicating about it.

In step S401, the threshold configurator 103 calculates the polling interval P. The polling interval P has to be configured so that the retry counter value 119 is read out before a data amount that is allowed to be accumulated is stored in the buffers 109-111. In the embodiment 1, the polling interval P is calculated by: a data amount allowed to be accumulated in the buffers 109-111 [Bytes]/effective capacity [Bytes/sec]. These values are inputted on the threshold configuration GUI 102.

In step S402, the threshold configurator 103 calculates the PE bus priority configuration duration S. The PE bus priority configuration duration S has to be configured to a time by which the network interface 122 can be preferentially used until the data accumulation in the buffers 109-111 is resolved. In the embodiment 1, it is assumed that increase speed of data in the buffer is the same as decrease speed of data in the buffer. The duration S is calculated by: the data amount allowed to be accumulated in the buffers 109-111 [Bytes]/effective capacity [Bytes/sec].

In step S403, the threshold configurator 103 calculates the retry counter upper limit R. The retry counter upper limit R has to be configured in accordance with the packet number that is allowed to be accumulated in the buffers 109-111. In the embodiment 1, the upper limit R is calculated by: the data amount allowed to be accumulated in the buffers 109-111 [Bytes]/a packet payload amount [Bytes]. The packet payload amount is inputted on the threshold configuration GUI 102.

FIG. 5 is a diagram showing a display image of the threshold configuration GUI 102. The threshold configuration GUI 102 includes a packet payload size input section 501, an acceptable accumulation size input section 502, and an effective transmission capacity input section 503.

The packet payload size input section 501 specifies a packet payload size of the process data 101 inputted into the data processing device 100. The packet payload size is a net data size excluding header portions in the packet.

The acceptable accumulation size input section specifies a data size that is allowed to be accumulated in the buffers 109-111 of the data processing device 100.

The effective transmission capacity input section 503 specifies an effective capacity of the process data 101 inputted into the data processing device 100. The effective capacity is the maximum data transmission speed when the process data 101 is outputted to the data processing device 100. If the process data 100 is outputted to the data processing device 100 at a constant speed, the constant speed is designated as the effective capacity. If the transmission speed is variable, the maximum speed may be designated as the effective capacity.

Figure 6:
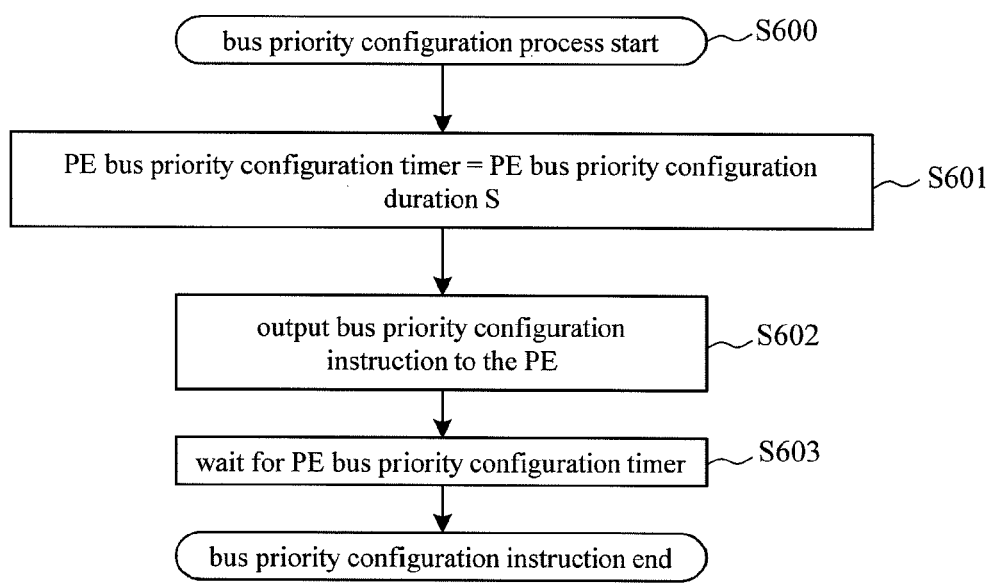
FIG. 6 is a flowchart showing an operation of a bus priority configurator 105.

FIG. 6 is a flowchart showing an operation of the bus priority configurator 105. Hereinafter, each step in FIG. 6 will be described.

In step S600, the bus priority configurator 105 starts the flowchart. This step is initiated when receiving the bus priority configuration instruction from the network congestion determinator 104.

In step S601, the bus priority configurator 105, according to the value calculated by the threshold configurator 103, configures a time so that the network interface 122 can preferentially use the shared bus 105.

In step S602, the bus priority configurator 105 outputs a bus priority configuration signal 120 to the PE specified by the network congestion determinator 104. The bus priority configuration signal 120 is coupled to the interrupt inputs of the PEs 112-114 to activate the interrupt handling process of the PE. When outputting the bus priority configuration signal 120, the bus priority configurator 105 designates the PE bus priority configuration duration S along with it.

In step S603, the bus priority configurator 105 waits for the PE bus priority configuration timer that is configured in step S601.

Figure 7:
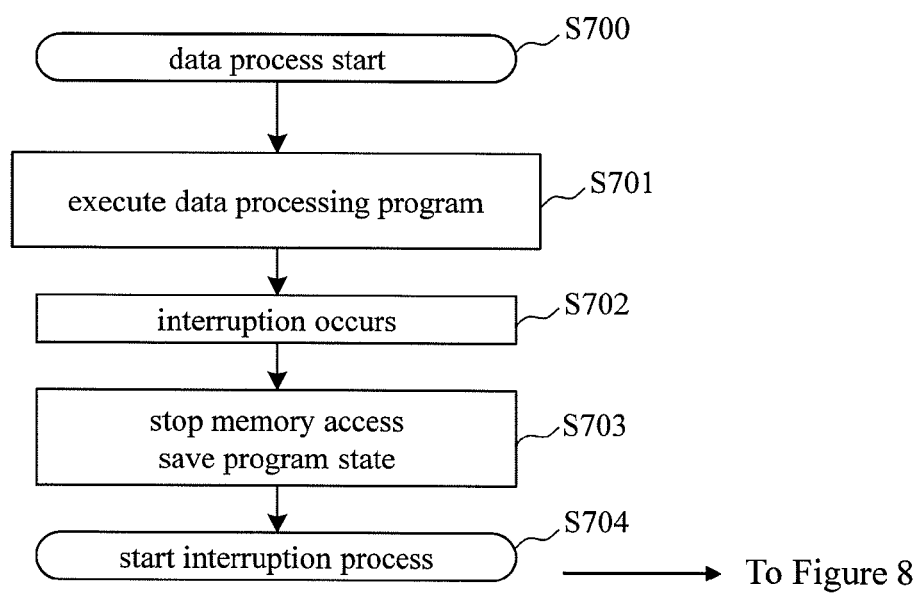
FIG. 7 is a flowchart showing an operation of a processor core 121.
Figure 7:
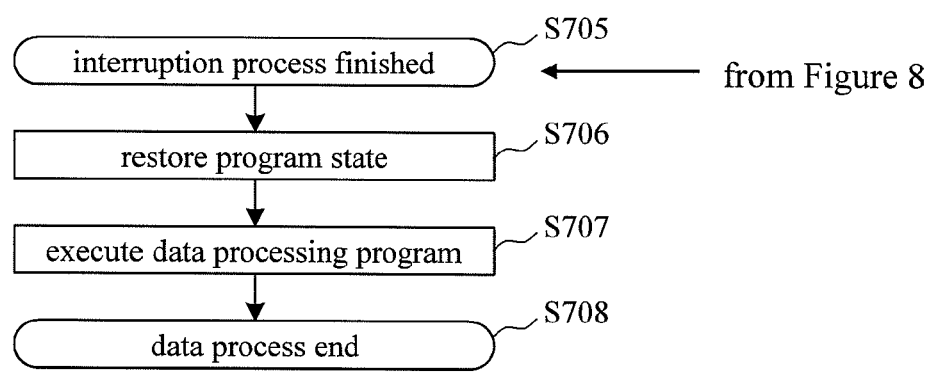

FIG. 7 is a flowchart showing an operation of the processor core 121. Hereinafter, each step in FIG. 7 will be described.

In step S700, the processor core 121 starts processing the process data 101. This step is initiated in compliance with predetermined job schedules and the like after the processor core 121 receives the process data 101.

In step S701, the processor core 121 executes a data processing program for processing the process data 101. The data processing program in this step is a program implementing processes for formatting the process data 101, for example. The program is stored in an appropriate storage device included in the data processing device 100.

In step S702, it is assumed that the processor core 121 receives the bus priority configuration signal 120. This causes an interruption to the data processing program executed from step S701.

In step S703, the processor core 121 performs, in accordance with the occurrence of the interruption, releasing the control right of the shared bus, stopping accesses to the memory 116, and saving the program state when the interruption occurred.

In step S704, the processor core 121 starts an interrupt handling process described in FIG. 8 later. After finishing the process of FIG. 8, the processor core 121 returns to this flowchart (S705).

In step S706, the processor core 121 restores the program state at the time the interruption occurred that is saved in step S703 to return to the state before the interruption occurred.

In step S707, the processor core 121 restarts executing the data processing program. After finishing the data processing program, this flowchart terminates (S708).

Figure 8:
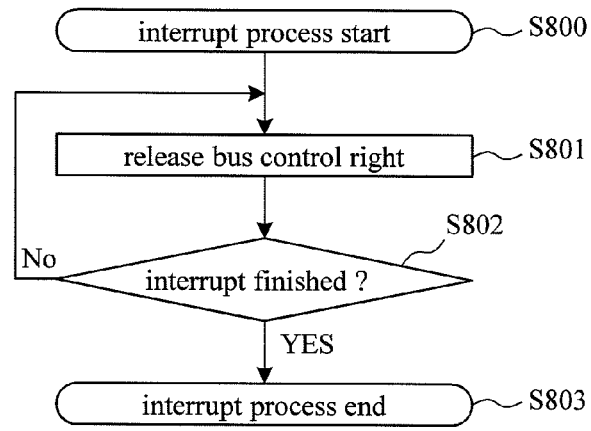
FIG. 8 is a flowchart showing details of the interrupt handling process occurring in step S704.

FIG. 8 is a flowchart showing details of the interrupt handling process occurring in step S704. In step S800, this flowchart is initiated. The processor core 121 releases the control right of the shared bus 115 (S801). The processor core 121 waits for the PE bus priority configuration duration S (S802). When the PE bus priority configuration duration S has passed, the processor core 121 determines that the interrupt handling process has been finished, and terminates this flowchart (S803).

Embodiment 1

Comparison with Conventional Examples

Hereinafter, in order to compare with the data processing device 100 according to the embodiment 1, configurations and operational examples of conventional data processing devices will be described.

Figure 9:
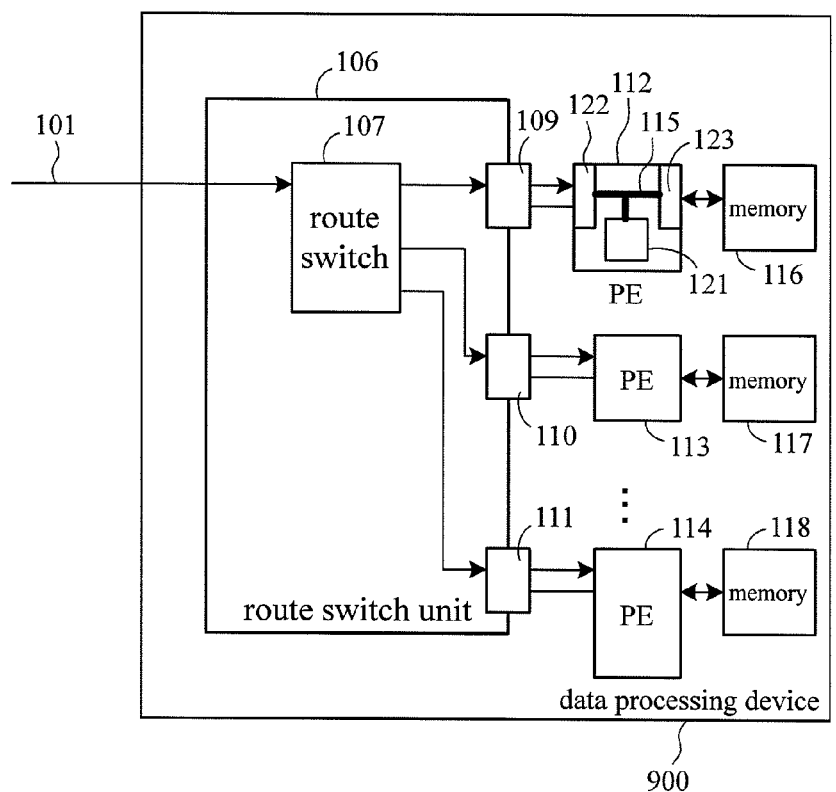
FIG. 9 is a configuration diagram of a conventional data processing device 900.

FIG. 9 is a configuration diagram of a conventional data processing device 900. The data processing device 900 does not include the threshold configuration GUI 102, the threshold configurator 103, the network congestion determinator 104, the bus priority configurator 105, the retry counter 108, the retry counter value 119, and the bus priority configuration signal 120 among the functional units included in the data processing device 100 of FIG. 1. The same reference signs as FIG. 1 are assigned to other configurations that have functions similar to those of FIG. 1, and descriptions for those components will be omitted.

In FIG. 9, the data processing device 900 performs the same process as that of the data processing device 100 when the shared bus 115 is Available. Hereinafter, the process flow when the shared bus 115 is Unavailable will be described.

The process flow from the network interface 122 receives the process data 101 to the buffers 109-111 perform the retry process are the same as those of the data processing device 100. If the buffers 109-111 continuously perform the retry process, the buffer storing the process data 101 will be FULL (no more capacity), buffer overflow will occur, and the data processing device 100 will not work (device suspended).

Figure 10:
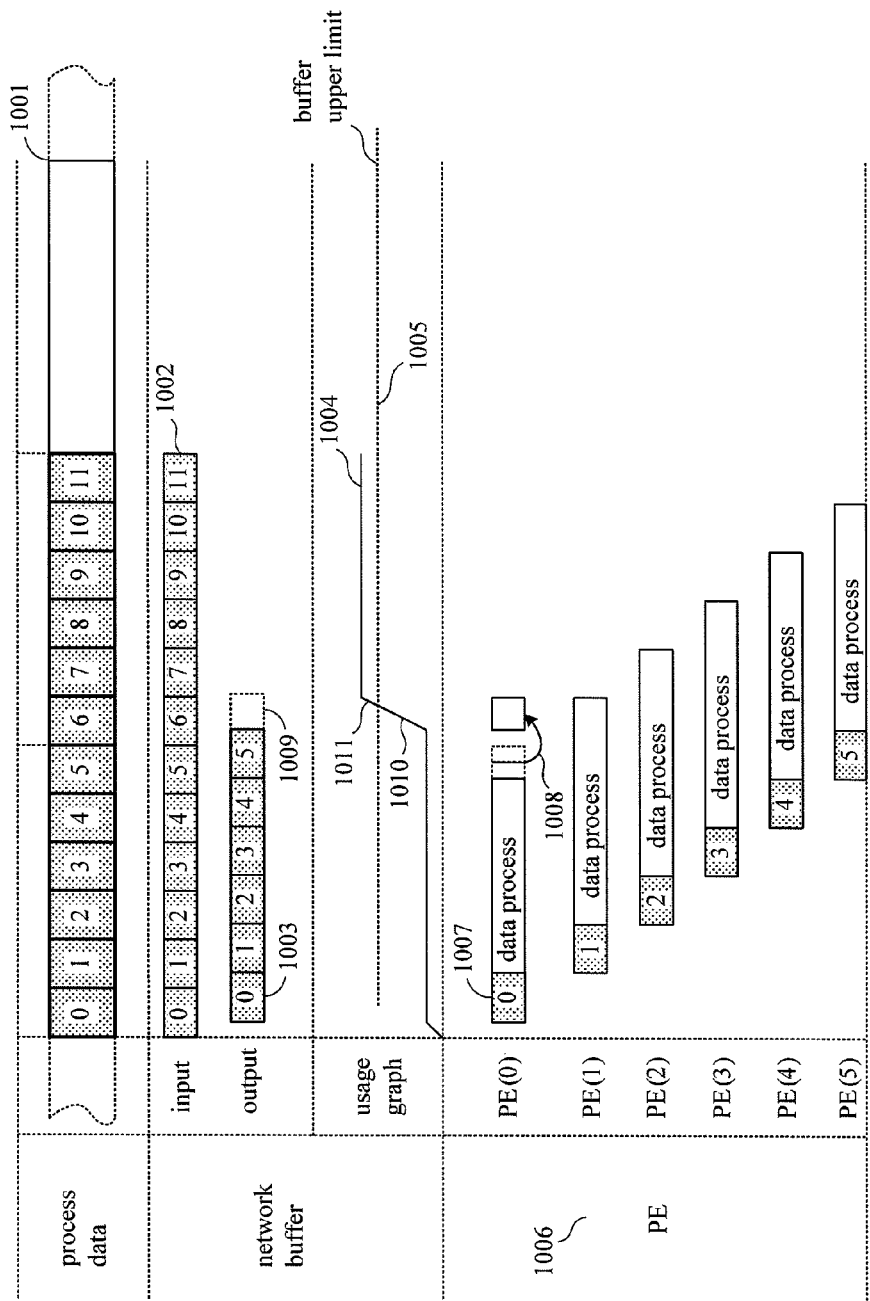
FIG. 10 is a diagram showing a flow of process data 101 on the data processing device 900.

FIG. 10 is a diagram showing a flow of process data 101 on the data processing device 900. Hereinafter, the dataflow in FIG. 10 will be described when the shared bus 115 is Available and Unavailable, respectively.

(1) When the Shared Bus 115 is Available

The flow until the network interface 122 receives the process data is the same as that of the data processing device 100, thus omitted.

(FIG. 10: 1001) The process data 101 is inputted into the data processing device 900 with a constant throughput in the sequence of packet numbers 0, 1, . . . .

(FIG. 10: 1002) The process data 101 is transmitted to the buffers 109-111 corresponding to the destination ID at the route switch 107. The buffers 109-111 buffer the received process data 101.

(FIG. 10: 1003) The buffers 109-111 transmit the buffered process data 101 toward the network interface 122 of the PEs 112-114.

(FIG. 10: 1004) The reference sign 1004 indicates s graph schematically showing used amounts of the buffers 109-111. The usage matches with the value calculated by subtracting the output of the buffers 109-111 from the inputs thereof. The usage indicates the amount of process data 101 accumulated in the buffers 109-111 at a certain time t.

(FIG. 10: 1005) The reference sign 1005 schematically indicates the accumulation upper limit of the buffers 109-111. If the usage 1004 excesses the upper limit 1005, the buffer is in an overflow state. The process data 101 in such buffers cannot be used.

(FIG. 10: 1006) The reference sign 1006 indicates that the process data 101 is distributed to the PEs 112-114.

(FIG. 10: 1007) The process data 101 is inputted into the network interface 122 of the PEs 112-114. If the shared bus 115 is Available, the memory interface 123 writes the received process data 101 into the memories 116-118.

(2) When the Shared Bus 115 is Unavailable

The flow until the network interface 122 receives the process data is the same as that of the data processing device 100, thus omitted.

(FIG. 10: 1008) When the process data 101 is inputted into the network interface 122 of the PEs 112-114, if the processor core 121 acquires the control right of the shared bus 115 previously, the shared bus 115 becomes Unavailable.

(FIG. 10: 1009) If the shard bus 115 keeps Unavailable and the network interface 122 cannot receive the transmitted process data 101, in order to prevent packet loss, a packet requesting retransmission of the non-received packet (retry packet) is sent to the buffers 109-111. The buffers 109-111 stop reading out from the buffer that normally stores the process data 101.

(FIG. 10: 1010) If the buffers 109-111 continuously perform the retry process, the process data 101 will be accumulated in the buffer. The reference sign 1010 indicates the variation of the usage of the buffer.

(FIG. 10: 1011) The buffers 109-111 even keeps performing the retry process, the buffer storing the process data 101 becomes FULL (no more capacity) and buffer overflow occurs. The data processing device 900 cannot continue the process (device stop) due to the buffer overflow.

Figure 11:
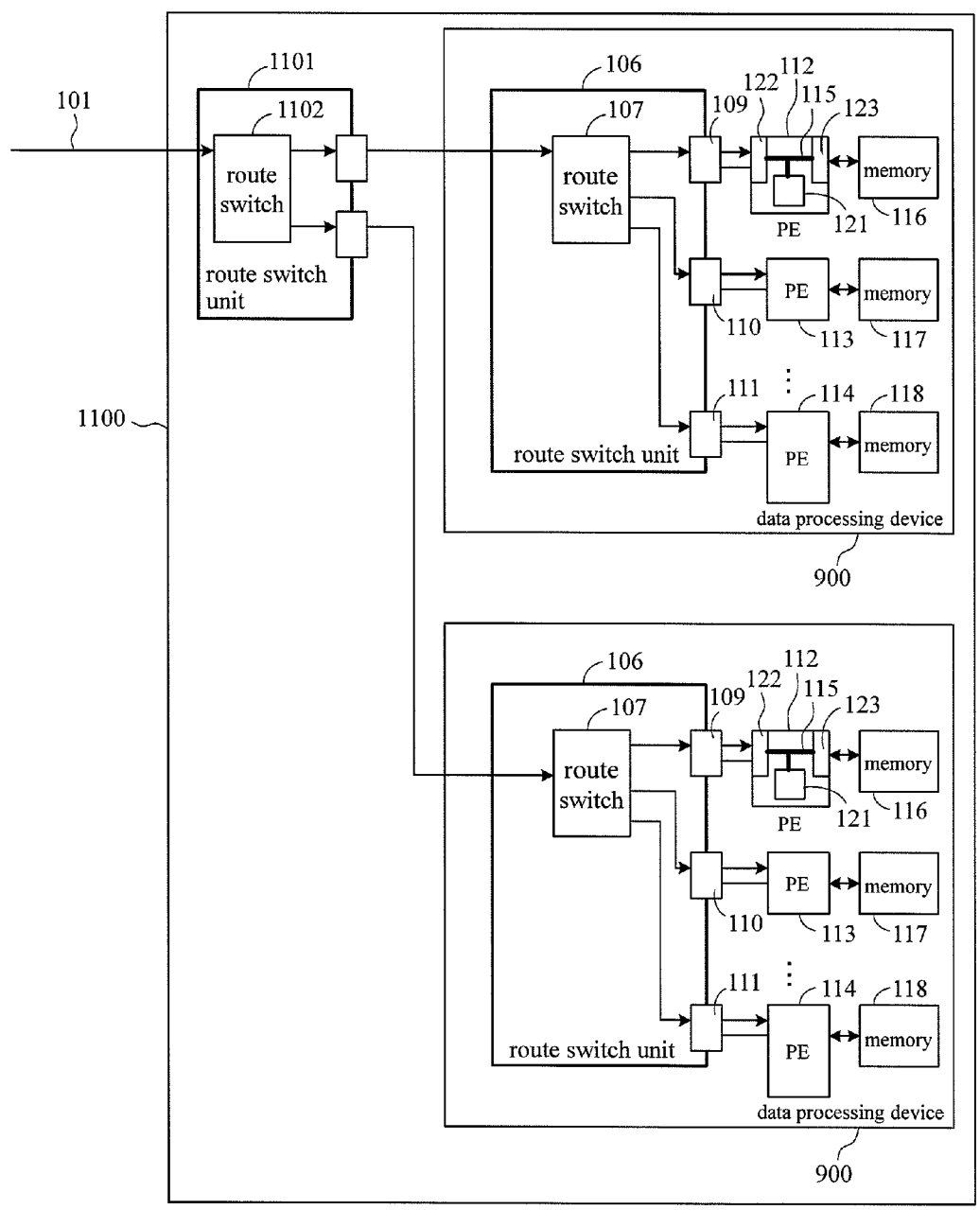
FIG. 11 is a configuration diagram of a conventional data processing device 1100.

FIG. 11 is a configuration diagram of a conventional data processing device 1100. The data processing device 1100 is different from the data processing device 900 in that the data processing device 1100 includes an function for avoiding process continuation failure (device stop) due to buffer overflow when temporal network congestion occurs.

The data processing device 1100 includes a route switch unit master 1101, a first data processing device 900, and a second data processing device 900. Since the first and the second data processing devices 900 are the same as FIG. 9, descriptions for those devices will be omitted.

FIG. 11 includes two of the data processing devices 900. The route switch unit master 1101 and its internal route switch master 1102 distribute the process data 101 to one of the data processing devices 900. Thus the data processing duration of the PEs 112-114 is decreased, and there will be a margin for the data transmission duration toward the memories 116-118. This avoids process continuation failure (device stop) due to buffer overflow when temporal network congestion occurs.

While FIG. 11 may avoid buffer overflow, the cost of the data processing device 900 is doubled compared to FIG. 9. In addition, the chassis size is enlarged.

Figure 12:
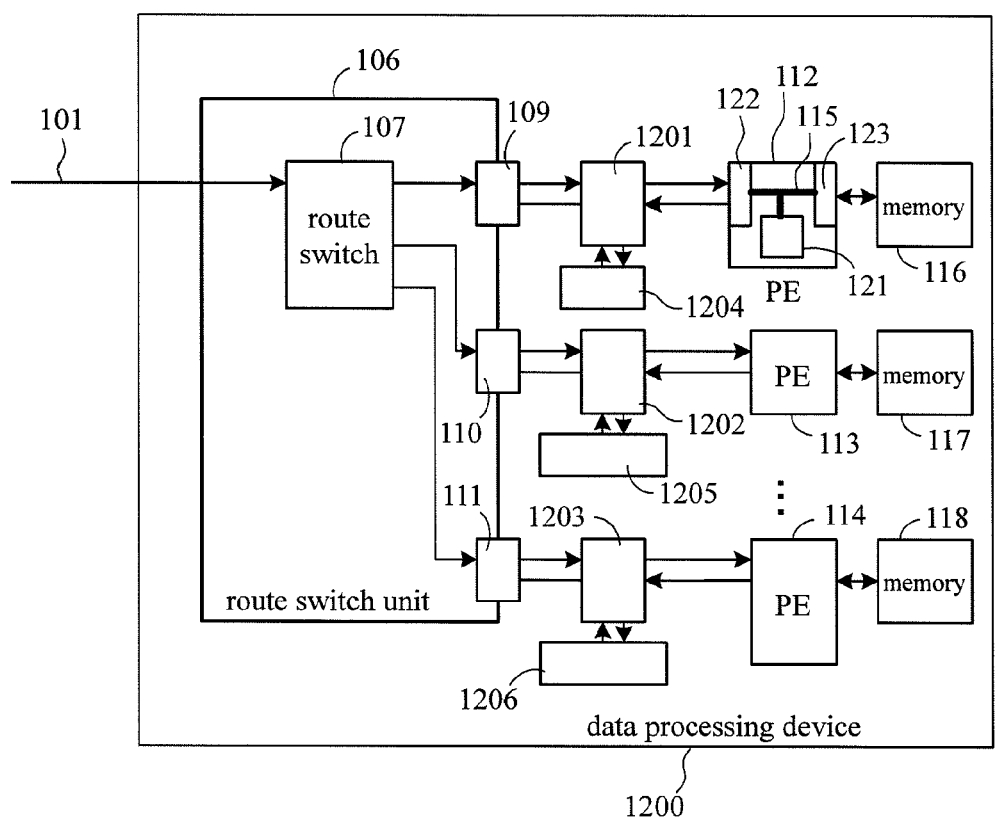
FIG. 12 is a configuration diagram of a conventional data processing device 1200.

FIG. 12 is a configuration diagram of a conventional data processing device 1200. The data processing device 1200 includes, in order to avoid process continuation failure (device stop) due to buffer overflow when temporal network congestion occurs, a configuration which is different from FIG. 11.

The data processing device 1200 includes, in addition to the data processing device 900, additional buffer controllers 1201-1203 and additional buffers 1204-1206. Since other configurations are the same as those of FIG. 9, the same reference signs are assigned and descriptions thereof will be omitted.

The additional buffers 1204-1206 store data instead of the buffers 109-111 when a certain amount of data is stored in the buffers 109-111. The additional buffer controllers 1201-1203 control the operations of the additional buffers 1204-1206.

The data processing device 1200 includes additional buffers before the PEs 112-114 compared to the data processing device 900 of FIG. 9. Thus it is possible to absorb the impact of temporal network congestion by the additional buffers to avoid process continuation failure (device stop) due to buffer overflow. However, the additional buffers increase the costs. In addition, the substrate size and the chassis size are enlarged.

On the other hand, the data processing device 100 according to the embodiment 1 configures a priority for the shared bus using the bus priority configuration signal 120 when temporal network congestion occurs, and the process data 101 is preferentially stored into the memories 116-118, thereby preventing buffer overflows. This operation does not require additional functional units such as in FIGS. 11-12, thus increase in cost or substrate/chassis sizes may be suppressed.

Embodiment 1

Dataflow in the Present Invention

Figure 13:
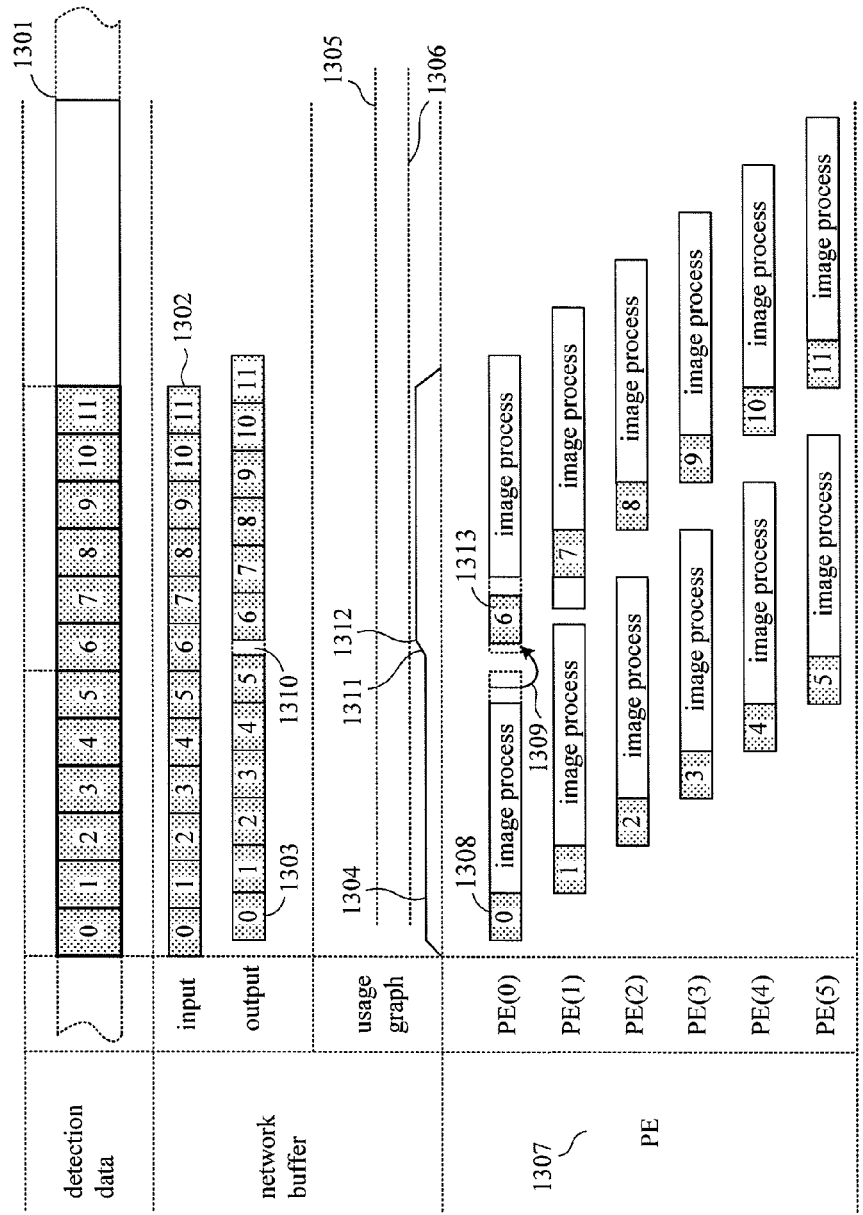
FIG. 13 is a diagram showing a flow of process data 101 on the data processing device 100.

FIG. 13 is a diagram showing a flow of process data 101 on the data processing device 100. Hereinafter, the dataflow in FIG. 13 when the shared bus 115 is Available and Unavailable will be described, respectively.

(1) When the Shared Bus 115 is Available

The flow until the network interface 122 receives the process data is already described, thus omitted. The reference signs 1301-1305 in FIG. 13 are the same as the reference signs 1001-1005 in FIG. 10.

(FIG. 13: 1306) The reference sign 1306 schematically shows the allowed accumulation size of the buffers 109-111. The network congestion determinator 104 determines that network congestion has occurred if the network congestion determinator 104 determined that the usage of the buffers 109-111 may excess the upper limit 1306. The network congestion determinator 104 then configures the bus priority with respect to the PEs 112-114 through the bus priority configurator 105.

(FIG. 13: 1307) The reference sign 1307 indicates that the process data 101 is distributed to the PEs 112-114.

(FIG. 13: 1308) The process data 101 is inputted into the network interface 122 of the PEs 112-114. If the shared bus 115 is Available, the memory interface 123 writes the received process data 101 into the memories 116-118.

(2) When the Shared Bus 115 is Unavailable

The flow until the network interface 122 receives the process data is already described, thus omitted. The reference signs 1309-1311 in FIG. 13 correspond to the reference signs 1008-1010 in FIG. 10. Regarding the reference sign 1311, the incremental amount is reduced compared to FIG. 10 due to the mechanism suppressing increase in data amount of the memories 109-111.

(FIG. 13: 1312) The network congestion determinator 104 performs congestion determination according to the retry counter value 119. The network congestion determinator 104 outputs the bus priority configuration signal 120 to the corresponding PE among the PEs 112-114 if the network congestion determinator 104 determines that the data amount accumulated in the buffers 109-111 reaches the acceptable accumulation size.

(FIG. 13: 1313) The PEs 112-114 suspends the operation of the processor core 121 for the PE bus priority configuration duration S according to the received bus priority configuration signal 120. Accordingly, the control right of the shared bus 115 is released for the processor core 121 to access the memories 116-118. Thus the process data 101 can be preferentially stored into the memories 116-118.

Embodiment 1

Summary

As discussed thus far, the data processing device 100 according to the embodiment 1 detects the possibility of buffer overflow in advance according to the retry counter value 119 for each of the buffers 109-111, and outputs the bus priority configuration signal 120 to the PEs 112-114. The processor core 121 suspends the data processing and configures the priority control right of the shared bus 115 so that the process data 101 will be preferentially received. This avoids buffer overflow due to the shared bus 115 being occupied.

In addition, the data processing device 100 according to the embodiment 100 may avoid buffer overflow when temporal network congestion occurs without duplexing the data processing device as in the data processing device 1100 of FIG. 11 or without adding buffers as in the data processing device 1200 of FIG. 12. This may decrease costs of the data processing device, decrease sizes of chassis, and reduce power consumptions.

Embodiment 2

Figure 14:
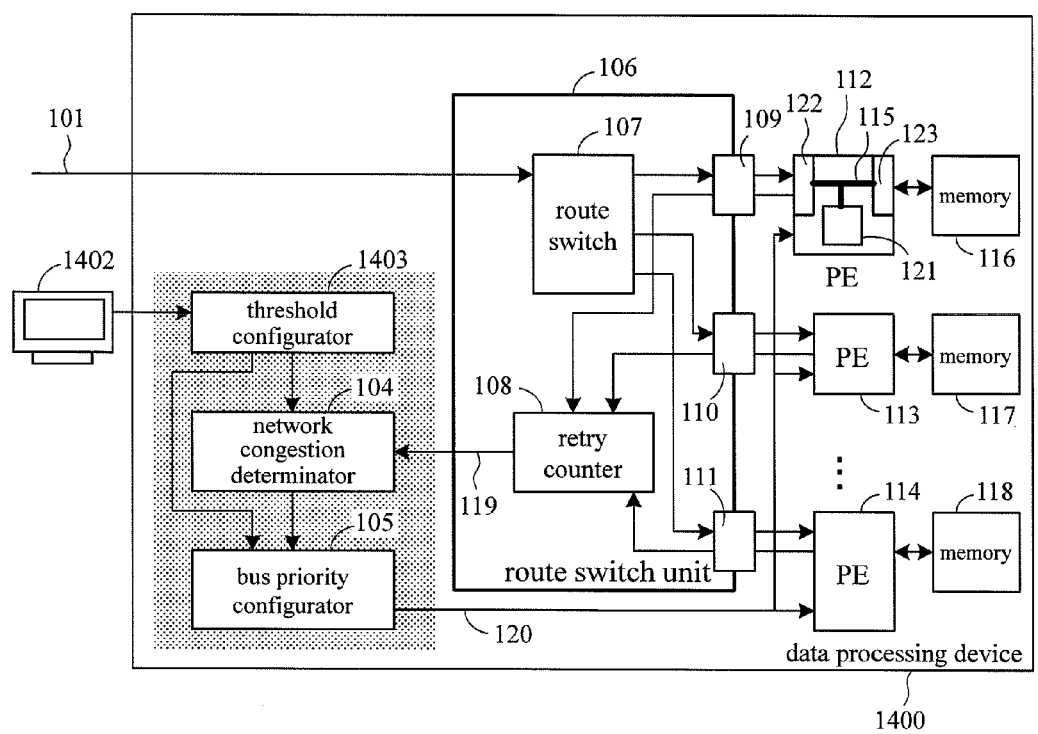
FIG. 14 is a configuration diagram of a data processing device 1400 according to an embodiment 2.

FIG. 14 is a configuration diagram of a data processing device 1400 according to an embodiment 2. In the data processing device 1400, the threshold configuration GUI 102 and the threshold configurator 103 in the data processing device 100 shown in FIG. 1 are replaced with a threshold configuration GUI 1402 and a threshold configurator 1403, respectively. Other configurations are the same as those of FIG. 1, thus descriptions thereof are omitted.

Figure 15:
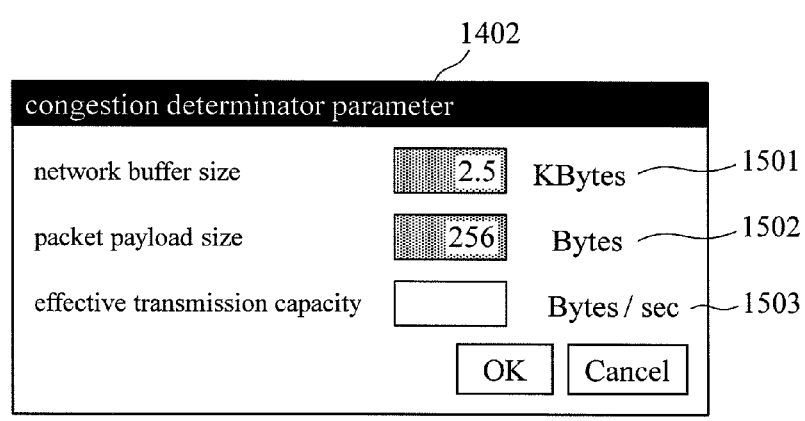
FIG. 15 is a diagram showing a display image of a threshold configuration GUI 1402.

FIG. 15 is a diagram showing a display image of the threshold configuration GUI 1402. The threshold configuration GUI 1402 includes a network buffer size display section 1501, a packet payload size display section 1502, and an effective transmission capacity input section 1503.

The network buffer size display section 1501 displays sizes of the buffers 109-111 detected by the threshold configurator 1403 using the procedure described later. The packet payload size display section 1502 displays a packet payload size detected by the threshold configurator 1403 using the procedure described later. The effective transmission capacity input section 1503 specifies the effective capacity of the process data 101 inputted into the data processing device 1400.

Figure 16:
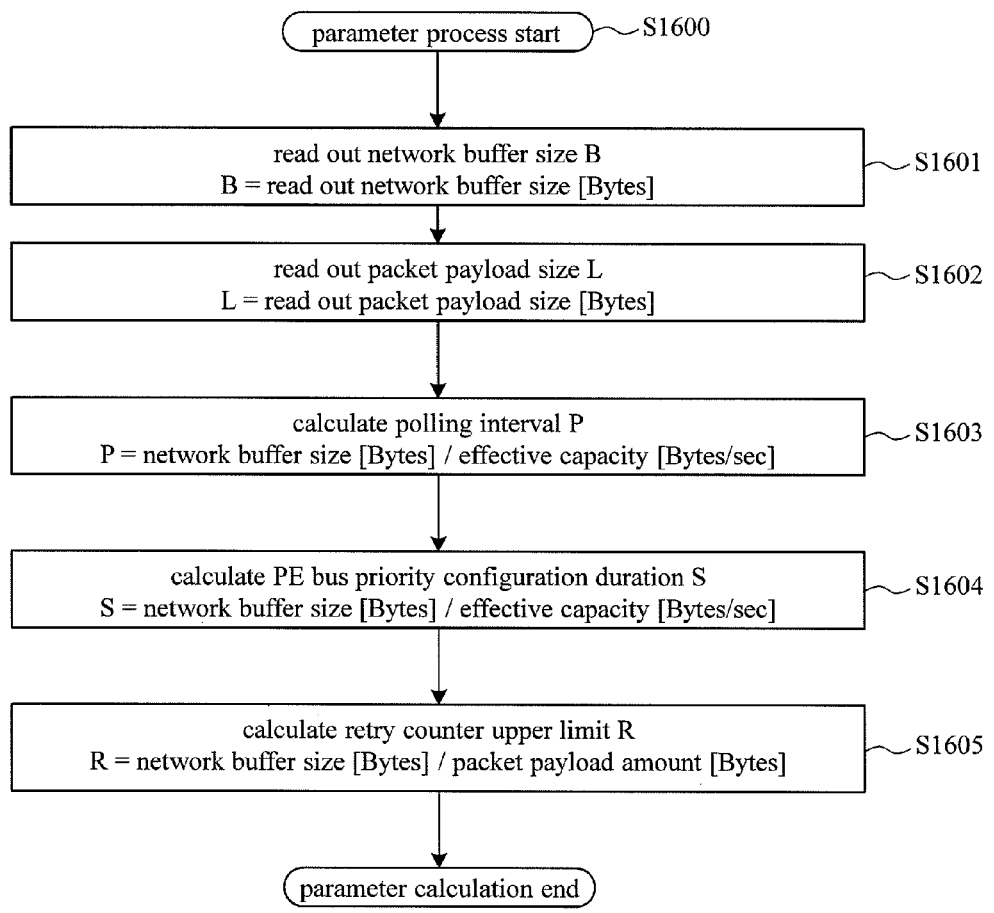
FIG. 16 is a flowchart showing an operation of a threshold configurator 1403.

FIG. 16 is a flowchart showing an operation of the threshold configurator 1403. Hereinafter, each step in FIG. 16 will be described.

In step S1600, the threshold configurator 1403 starts the flowchart. This step is initiated when the threshold configurator 1403 is launched. The threshold configuration GUI 1402 is displayed on a screen device such as a display.

In step S1601, the threshold configurator 1403 reads out a network buffer size B. The route switch unit 106 may store, in its register, the sizes of the buffers 109-111 as parameters. The threshold configurator 1403 reads out the parameters from the register, and displays them on the network buffer size display section 1501 as the network buffer size B. The network buffer size B corresponds to the data amount that is allowed to be accumulated in the buffers 109-111 in FIG. 5.

In step S1602, the threshold configurator 1403 reads out a packet payload size L. The route switch unit 106 may store, in its register, the packet payload size as a parameter. The threshold configurator 1403 reads out the parameter from the register, and displays it on the packet payload size display section 1502 as the packet payload size L.

Steps S1603-S1605 are the same as steps S401-S403 in FIG. 4 except that the network buffer size B is used instead of the data amount that is allowed to be accumulated in the buffers 109-111.

Embodiment 2

Summary

As discussed thus far, the data processing device 1400 according to the embodiment 2 achieves the same advantageous effect as the embodiment 1 only by inputting the effective capacity on the threshold configuration GUI 1402. Thus operational burdens of users may be decreased.

Embodiment 3

In an embodiment 3 of the present invention, a configuration example will be described where buffer overflow is avoided by load-balancing to other PEs instead of or along with configuring the priority of the shared bus 115 when temporal network congestion occurs.

Figure 17:
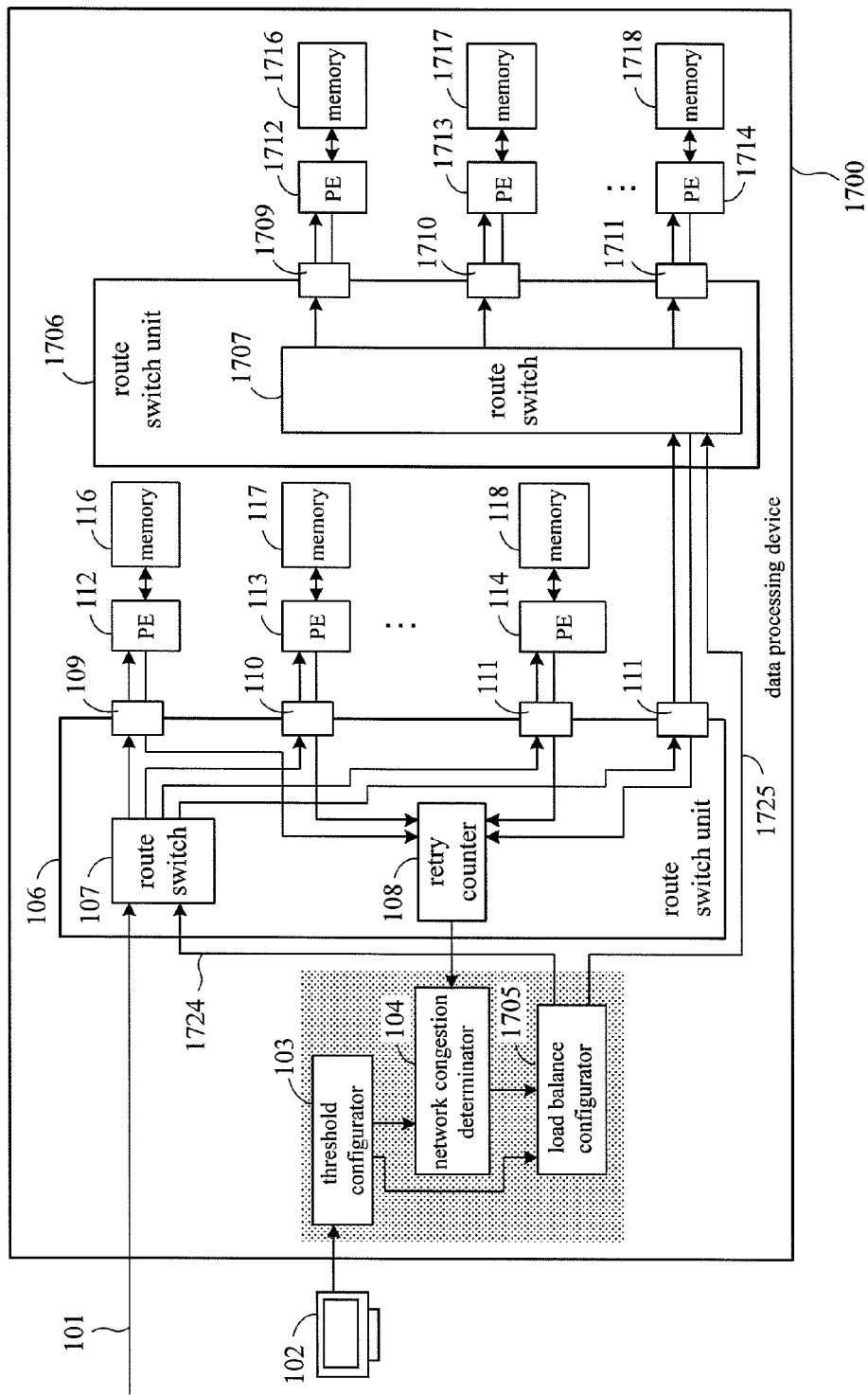
FIG. 17 is a configuration diagram of a data processing device 1700 according to an embodiment 3.

FIG. 17 is a configuration diagram of a data processing device 1700 according to the embodiment 3. The data processing device 1700 includes a load balance configurator 1705 instead of the bus priority configurator 105 in the data processing device 100 in the embodiment 1. Further, the data processing device 1700 additionally includes a route switch unit 1706, buffers 1709-1711, PEs 1712-1714, and memories 1716-1718. Other configurations are the same as those of the data processing device 100, thus the same reference signs are assigned to them and descriptions thereof will be omitted.

The route switch unit 1706, the route switch 1707, the buffers 1709-1711, the PEs 1712-1714, and the memories 1716-1718 have the same functions as those of the route switch unit 106, the route switch 107, the buffers 109-111, the PEs 112-114, and the memories 116-118. For the sake of convenience, the PEs 112-114 are referred to as a first processor cluster and the PEs 1712-1714 are referred to as a second processor cluster.

The load balance configurator 1705 distributes, according the determination result of the network congestion determinator 104, the process data 101 to one of the first processor cluster and the second processor cluster. The load balance configurator 1705 outputs a load balance instruction master signal 1724 when configuring the distribution to the first processor cluster, and outputs a load balance instruction slave signal 1725 when configuring the distribution to the second processor cluster. The load balance configurator 1705 corresponds to "buffer accumulation suppressor" in the embodiment 3.

Figure 18:
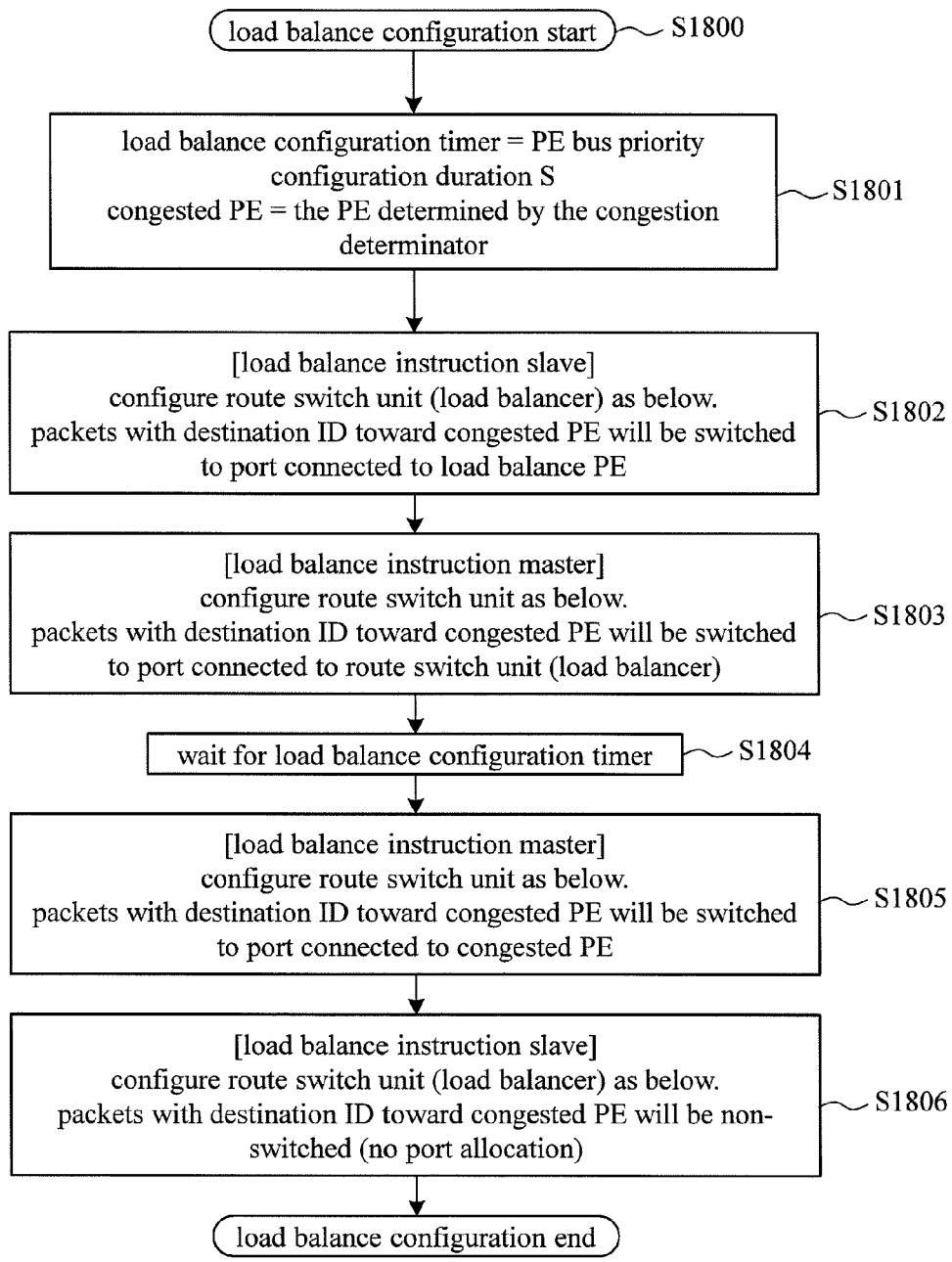
FIG. 18 is a flowchart showing an operation of a load balance configurator 1705.

FIG. 18 is a flowchart showing an operation of the load balance configurator 1705. Hereinafter, each step in FIG. 18 will be described.

In step S1801, the load balance configurator 1705 acquires the value calculated by the threshold configurator 103 and the ID of the PE in which the network congestion determinator 104 determines that congestion has occurred. The load balance configurator 1705 stores those values into each of variables.

In step S1802, the load balance configurator 1705 outputs the load balance instruction slave signal 1725 to configure the route switch unit 1706 so that the packets destined to the congested PE will be outputted to the port where the PE in the second processor cluster is connected.

In step S1803, the load balance configurator 1705 outputs the load balance instruction master signal 1724 to configure the route switch unit 106 so that the packets destined to the congested PE will be outputted to the port where the route switch unit 1706 is connected.

In step S1804, the load balance configurator 1705 waits for the PE bus priority configuration timer calculated by the threshold configurator 103.

In step S1805, the load balance configurator 1705 outputs the load balance instruction master signal 1724 to configure the route switch unit 106 so that the packets destined to the congested PE will be outputted to the PE. This step is for undoing the configuration in step S1803 back to before the configuration.

In step S1806, the load balance configurator 1705 outputs the load balance instruction slave signal 1725 to configure the route switch unit 1706 so that the packets destined to the congested PE will be non-switched (no port allocation). This step is for undoing the configuration in step S1802 back to before the configuration.

Embodiment 3

Summary

As discussed thus far, the data processing device 1700 according to the embodiment 3 detects the possibility of occurrence of buffer overflow using the same procedure as that in the embodiments 1-2 to perform load-balancing between the first and second processor cluster, thereby avoiding process stop due to buffer overflow.

In the embodiment 3, the load balance configurator 1705 may be used with the bus priority configurator 105. In this case, for example, the first processor cluster is used to perform the same procedures as those in the embodiments 1-2 usually. If all of the PEs in the first processor cluster is congested, the packets are load-balanced to the second processor cluster. Alternatively, if the buffer memory in the PEs are full, and further write request toward the memory occurs, the data processing device may determine that the priority configuration in the embodiments 1-2 cannot be performed, and then may perform load-balancing.

Embodiment 4

Figure 19:
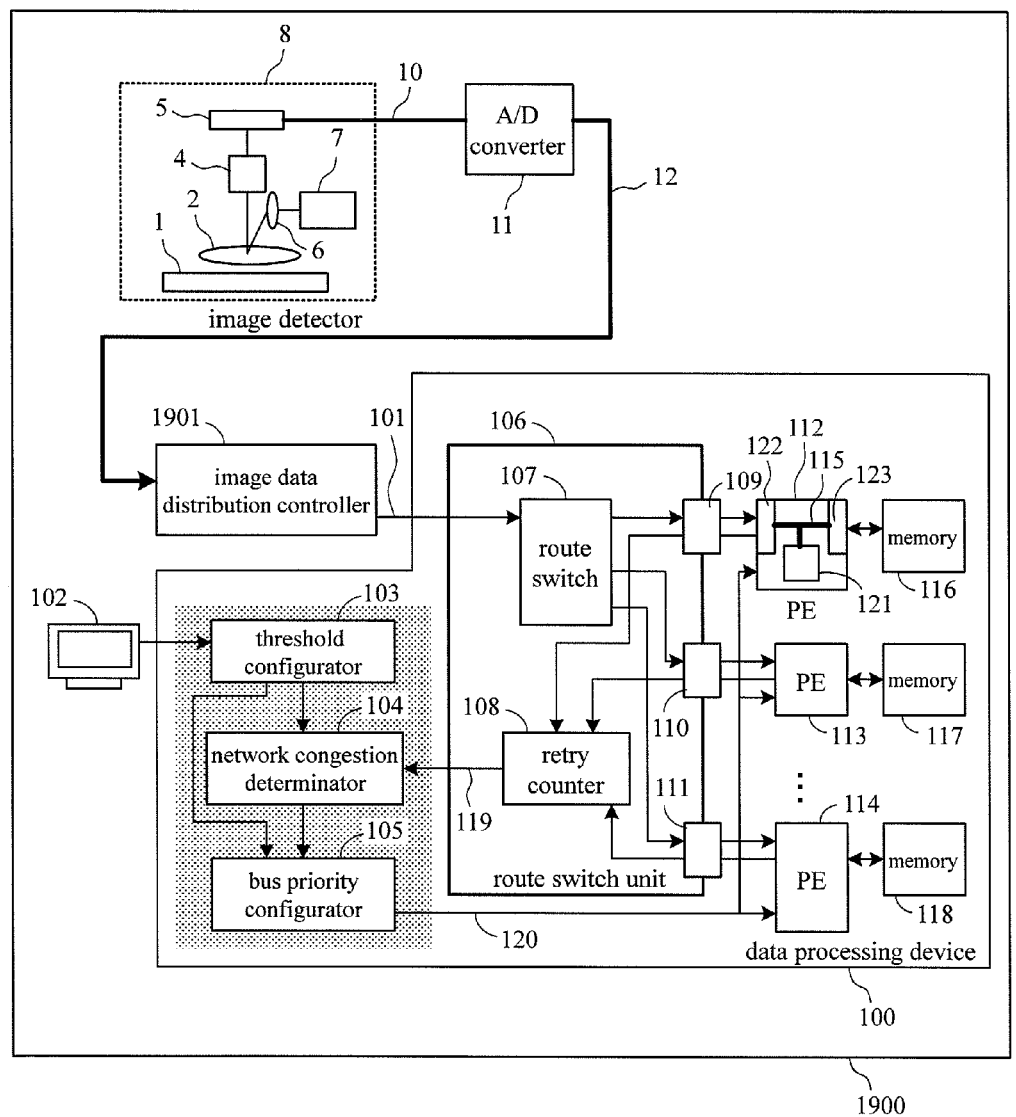
FIG. 19 is a configuration diagram of a semiconductor external view inspection device 1900 according to an embodiment 4.

FIG. 19 is a configuration diagram of a semiconductor external view inspection device 1900 according to an embodiment 4. The semiconductor external view inspection device 1900 includes a XY stage 1, a light source 7, a condenser lens 6, a wafer 2, an objective lens 4, an image sensor 5, an A/D converter 11, an image data distribution controller 1901, and a data processing device according to one of the embodiments 1-4. The figure shows a configuration including the data processing device 100 according to the embodiment 1.

The light source 7 outputs light (e.g. UV light, DUV light). The condenser lens 6 focuses the light outputted from the light source 7 into slit-like light, and irradiates it onto the wafer 2 through the objective lens 4. The XY stage 1 moves the wafer 2 in predetermined directions. The objective lens 4 focuses the light reflected from semiconductor circuit patterns formed on the wafer 2, and forms images of the focused light. The image sensor 5 is a sensor such as TDI sensors. The image sensor 5 images the circuit pattern images formed by the objective lens 4, and outputs analog image information 10. The A/D converter 11 converts the analog image information 10 into digital image information 12.

The image distribution controller 1901 divides the digital image information 12 into process unit images, and outputs them to the data processing device 100 as the process data 101. The image distribution controller 1901 may specify the PEs 112-114 to which the process data 101 is distributed.

Figure 20:
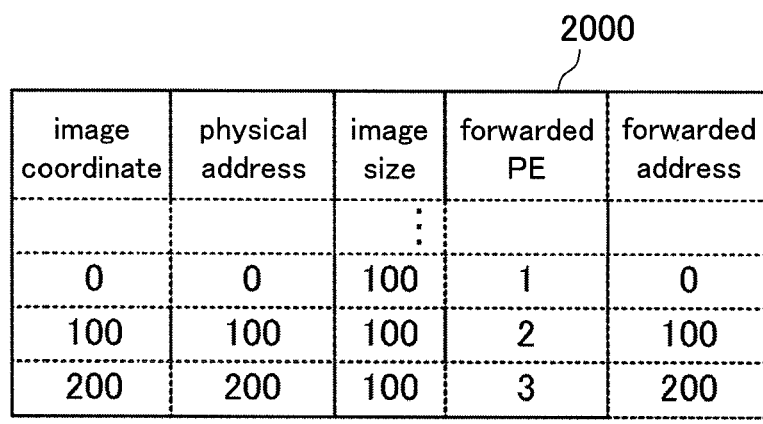
FIG. 20 is a diagram showing a configuration example of a distribution control table 2000 included in an image data distribution controller 1901.

FIG. 20 is a diagram showing a configuration example of a distribution control table 2000 included in the image data distribution controller 1901. The distribution control table 2000 defines a division range, division size, distributed PE, and the like. When the digital image information 12 is inputted, the image distribution controller 1901 divides the digital image information 12 according to the description of the distribution control table 2000, adds headers describing ID numbers indicating destination PEs, image sizes, or physical addresses, and outputs them as the process data 101 to the data processing device 100.

Figure 21:
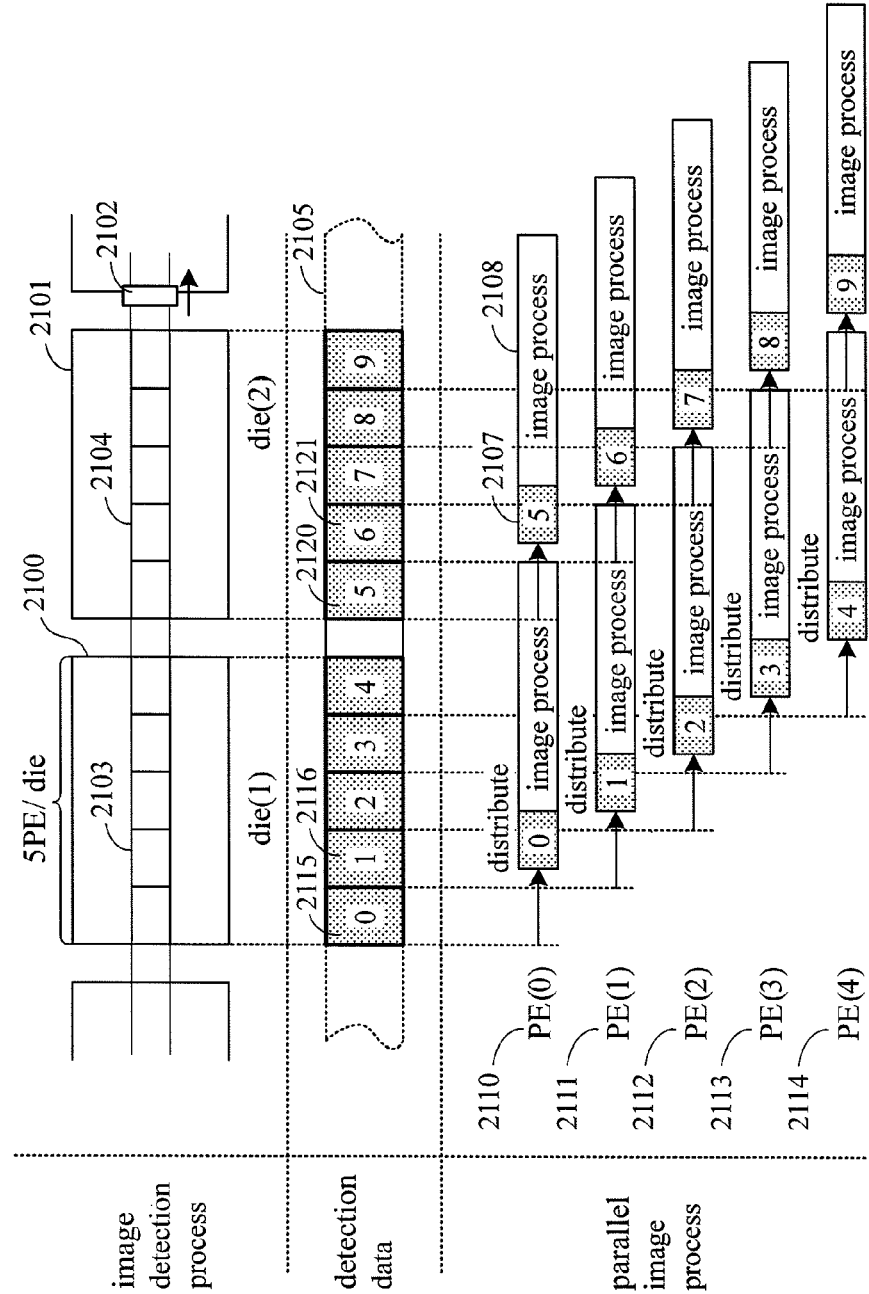
FIG. 21 is a diagram showing a data flow when the image data distribution controller 1901 distributes digital image information 12 to each PE.

FIG. 21 is a diagram showing a data flow when the image data distribution controller 1901 distributes the digital image information 12 to each PE. Hereinafter, the dataflow in FIG. 21 will be described. It is assumed that the data processing device 100 includes five processor elements PE(0)-PE(4).

Among the digital image information 12, the image data distribution controller 1901 distributes the image 2115 of the first die to the PE(0) (2110), distributes the image 2116 of the second die to the PE(1) (2111), and distributes similarly until the PE(5) (2114).

Scanning the wafer 2 is performed continuously by mechanics. Thus the first image 2120 of the next die 2101 is inputted into the image data distribution controller 1901 regardless of whether the image 2115 has been processed. The image data distribution controller 1901 forwards image date similarly to each PE.

The PE(0)-PE(4) perform image processing for the distributed data. For example, the PE(0) receives the image 2120 of the second die 2101 (2107), and performs the image processing 2108.

As discussed thus far, the semiconductor external view inspection device 1900 cuts out the continuously-inputted digital image information 12 into fundamental image units, distributes them to multiple PEs, and performs image processing. This achieves defect inspection of semiconductor circuit patterns formed on the wafer 2.

Figure 22:
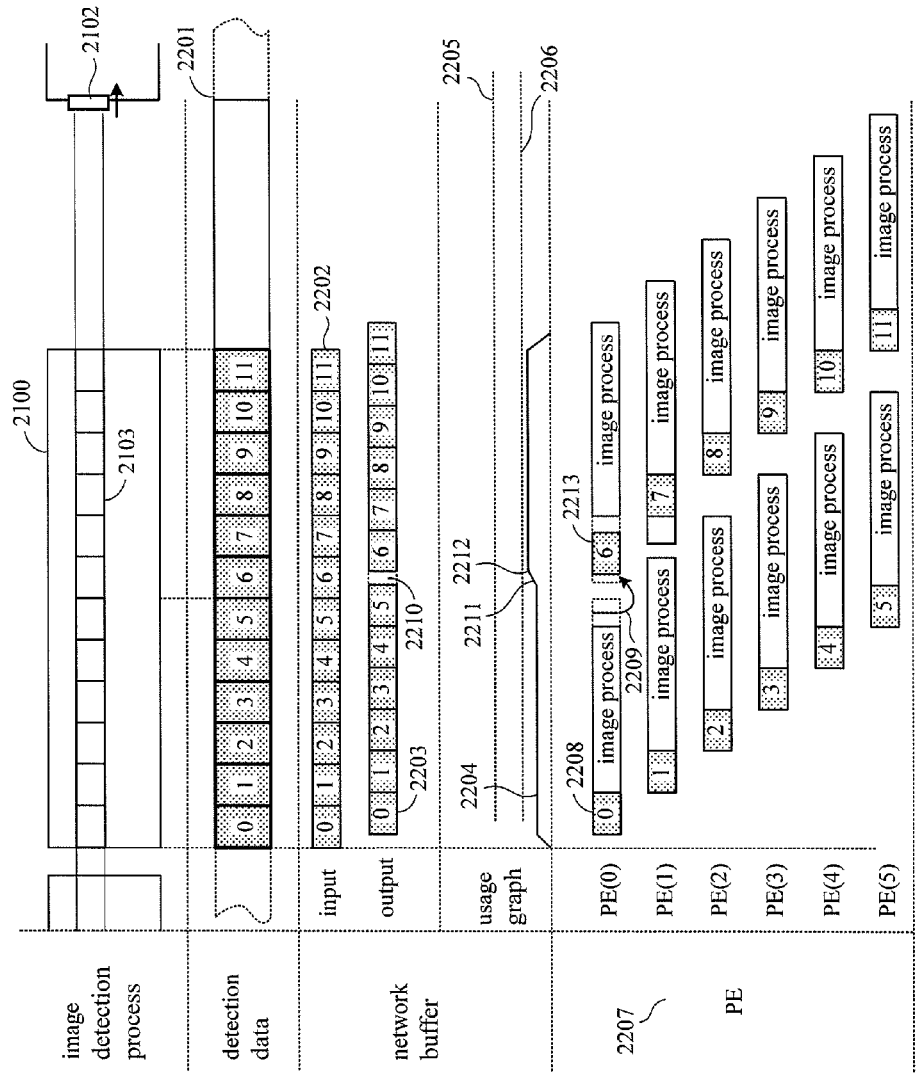
FIG. 22 is a diagram showing a flow of process data 101 on the semiconductor external view inspection device 1900.

FIG. 22 is a diagram showing a flow of the process data 101 on the semiconductor external view inspection device 1900. Hereinafter, the dataflow in FIG. 22 when the shared bus 115 is Available and Unavailable will be described, respectively.

(1) When the Shared Bus 115 is Available

The flow until the network interface 122 receives the process data is the same as that of the data processing device 100, thus omitted. The reference signs 2201-2205 are the same as the reference signs 1001-1005 in FIG. 10. The reference signs 2206-2208 are the same as the reference signs 1306-1308.

(2) When the Shared Bus 115 is Unavailable

The flow until the network interface 122 receives the process data is the same as that of the data processing device 100, thus omitted. The reference signs 2210-2211 are the same as the reference signs 1009-1010 in FIG. 10. The reference signs 2212-2213 are the same as the reference signs 1312-1313.

(FIG. 22: 2209) When the process data 101 is inputted into the network interface 122 of the PEs 112-114, if the processor core 121 has acquired the control right of the shared bus 115 previously, the shared bus 115 is Unavailable. The processor core 121 may have temporal heavy loads due to such as multiple defects. At this time, in order to continue accessing the memories 116-118 through the shared bus 115 along with image processing, the shared bus 115 keeps Unavailable.

Embodiment 4

Summary

As discussed thus far, even when network congestion occurs due to temporal increase in the load of the processor core 121, the semiconductor external view inspection device 1900 according to the embodiment 4 may prevent buffer overflow to continue defect inspections. Optical semiconductor external view inspection device, SEM semiconductor external view inspection device, or critical dimension SEM are examples of the semiconductor external view inspection device 1900.

Embodiment 5

Figure 23:
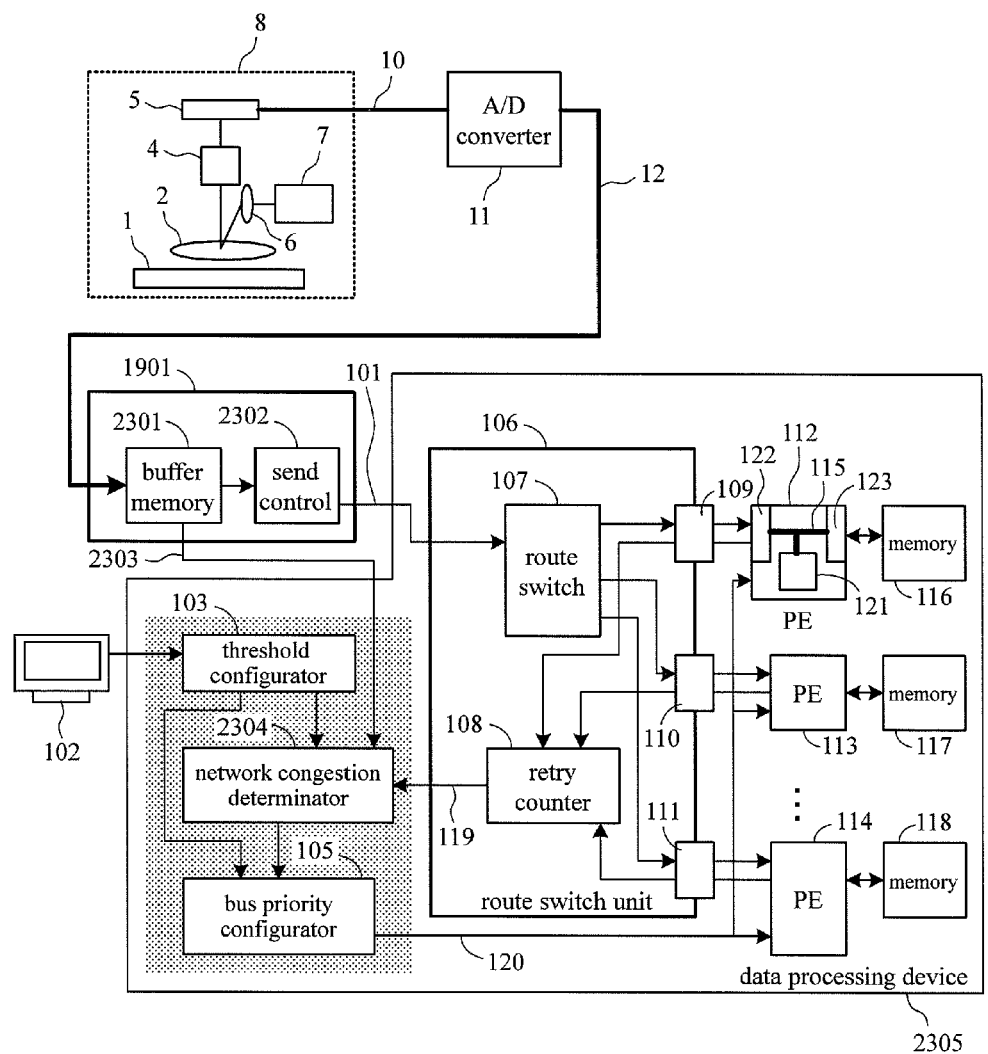
FIG. 23 is a configuration diagram of a semiconductor external view inspection device 2300 according to an embodiment 5.

FIG. 23 is a configuration diagram of a semiconductor external view inspection device 2300 according to an embodiment 5. The semiconductor external view inspection device 2300 includes, as components of the image data distribution controller 1901, an image data distribution buffer memory 2301 and an image data distribution send controller 2302, in addition to the semiconductor external view inspection device 1900. The semiconductor external view inspection device 2300 further includes a network congestion determinator 2304 instead of the network congestion determinator 104. Other configurations are the same as those of the semiconductor external view inspection device 1900, thus the same reference signs are assigned and descriptions thereof are omitted.

In the embodiment 5, the threshold configurator 103 configures the data amount that is allowed to be accumulated in the image data distribution buffer memory (acceptable accumulation size). The acceptable accumulation size may be inputted by users on the threshold configuration GUI 102, or the threshold configurator 103 may define it automatically according to the capacity of the image data distribution buffer memory 2301.

The image data distribution buffer memory 2301 is, for example, a FIFO memory. The digital image information 12 has to be outputted into the data processing device 100 with a constant throughput, and it is not allowed to interrupt the transmission while inputting into the data processing device 100. Thus when temporal network congestion occurs due to BUSY state of the processor core 121 of the PEs 112-114, the image data distribution buffer memory 2301 temporarily stores the digital image information 12. The image data distribution buffer memory 2301 then outputs an image data distribution buffer usage signal 2303 as a signal indicating the used amount of the image data distribution buffer memory 2301.

The image data distribution send controller 2302 controls whether the digital image data 12 is stored in the image data distribution buffer memory 2301 or the digital image data 12 is outputted into the data processing device 100 as the process data 101.

The network congestion determinator 2304 receives the image data distribution buffer usage signal 2303. The unit further reads out the number of the retry packet (retry counter value 119) received by the buffers 109-111.

Figure 24:
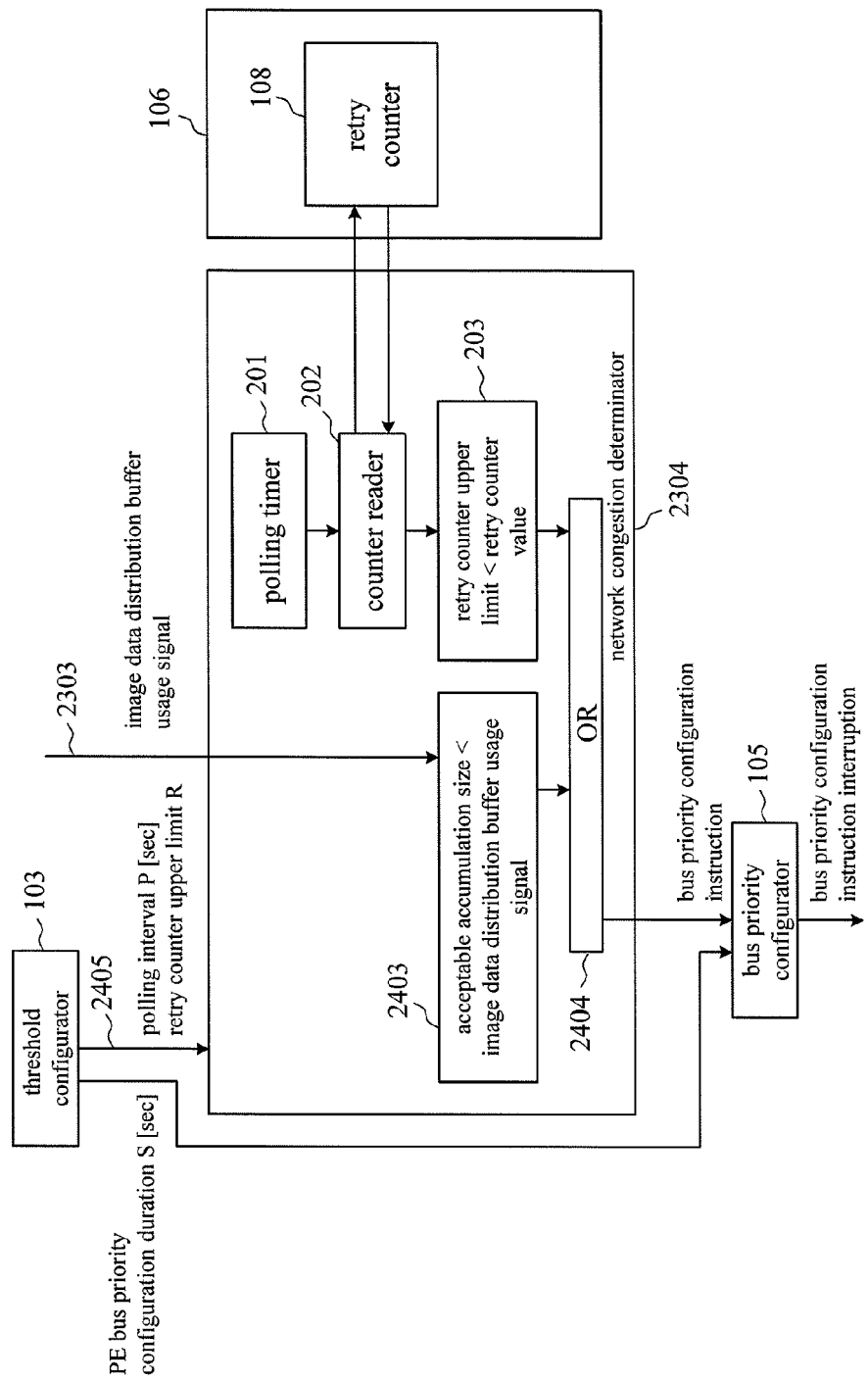
FIG. 24 is a diagram showing detailed configurations of a network congestion determinator 2304.

FIG. 24 is a diagram showing detailed configurations of the network congestion determinator 2304. The network congestion determinator 2304 includes, in addition to the configurations of the network congestion determinator 104, a determinator 2403 and a determination OR unit 2404. Other configurations are the same as those of the network congestion determinator 104, thus the same reference signs are assigned and descriptions thereof will be omitted.

The determinator 2403 compares the acceptable accumulation size (2404) configured by the threshold configurator 103 with the image data distribution buffer usage signal 2303. If the image data distribution buffer usage signal 2303 is larger than the acceptable accumulation size, the determinator 2403 determines that network congestion has occurred, and then outputs the bus priority configuration signal 120 to the bus priority configurator 105 through the determination OR unit 2404.

The determination OR unit 2404 calculates a logical OR of the determination result of the determinator 203 and the determination result of the determinator 2403, and outputs the OR result as the bus priority configuration signal 120. In other words, if the retry counter of one of the buffers 109-111 reaches the upper limit, or the usage of the image data distribution buffer memory 2301 reaches the acceptable accumulation size, the bus priority configuration signal 120 will be outputted.

Figure 25:
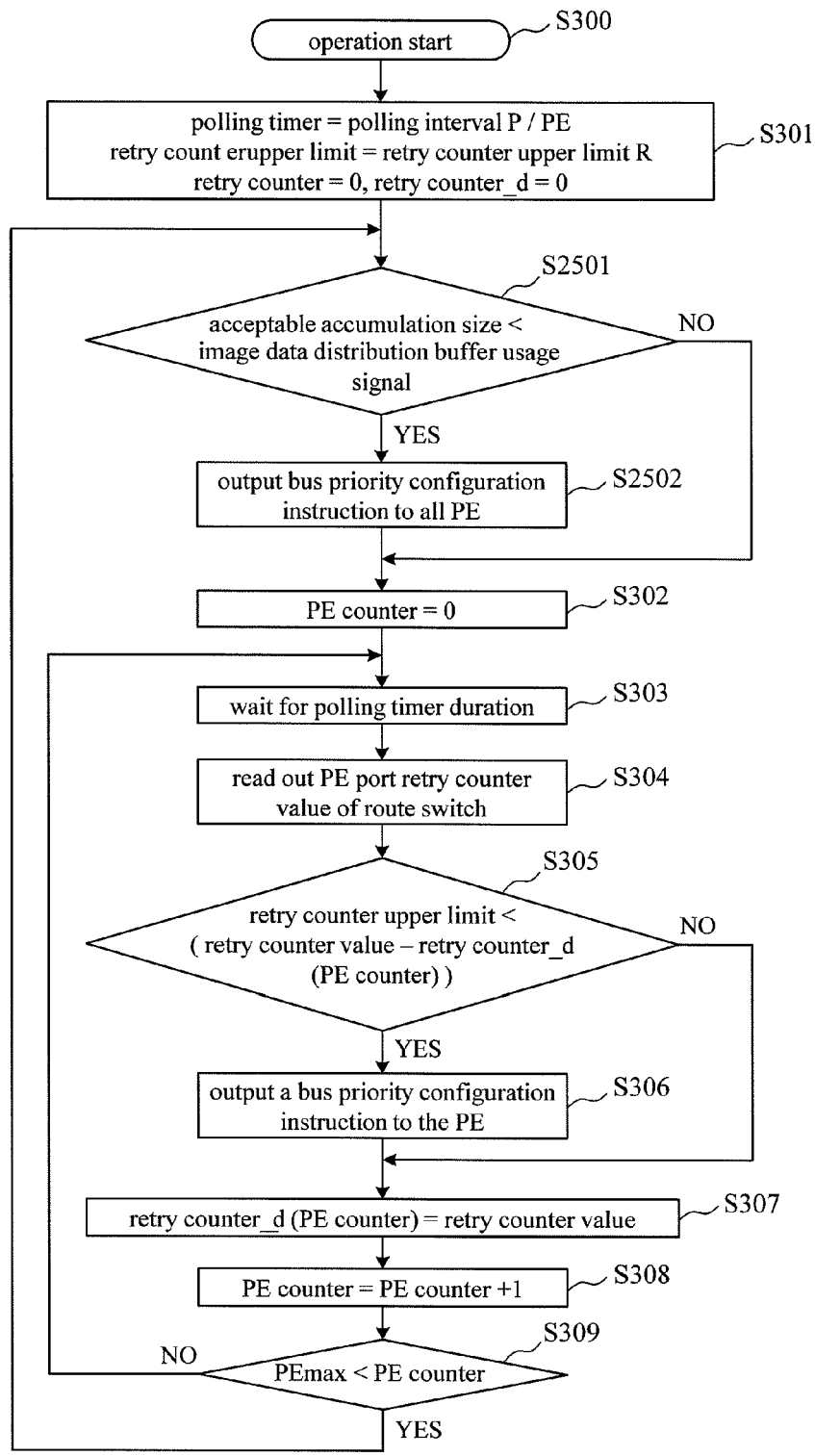
FIG. 25 is a flowchart showing an operation of the network congestion determinator 2304.

FIG. 25 is a flowchart showing an operation of the network congestion determinator 2304. This flowchart includes steps S2501 and S2502 in addition to the flowchart of FIG. 3. Other steps are the same as those of FIG. 3, thus descriptions thereof will be omitted.

In step S2501, the network congestion determinator 2304 compares the acceptable accumulation size of the image data distribution buffer memory 2301 with the image data distribution usage signal 2303. If the former is smaller, the process proceeds to step S2502. Otherwise the process skips to step S302.

In step S2502, the network congestion determinator 2304 outputs the bus priority configuration signal 120 to all of the PEs. Accordingly the processor core 121 temporarily interrupts the data processing, and thus the network interface 122 is facilitated to receive the process data 101. As a result, it is possible to facilitate the data accumulated in the image data distribution buffer memory 2301 to be outputted into the date processing device 100.

Embodiment 5

Summary

As discussed thus far, the semiconductor external view inspection device 2300 according to the embodiment 5 performs congestion determination for the buffers in the image data distribution controller 1901. Thus it is possible to avoid buffer overflow in the image data distribution controller 1901.

The present invention is not limited to the embodiments, and various modified examples are included. The embodiments are described in detail to describe the present invention in an easily understood manner, and the embodiments are not necessarily limited to the embodiments that include all configurations described above. Part of the configuration of an embodiment can be replaced by the configuration of another embodiment. The configuration of an embodiment can be added to the configuration of another embodiment. Addition, deletion, and replacement of other configurations are also possible for part of the configurations of the embodiments.

The configurations, the functions, the processing units, the processing means, etc., may be realized by hardware such as by designing part or all of the components by an integrated circuit. A processor may interpret and execute programs for realizing the functions to realize the configurations, the functions, etc., by software. Information, such as programs, tables, and files, for realizing the functions can be stored in a recording device, such as a memory, a hard disk, and an SSD (Solid State Drive), or in a recording medium, such as an IC card, an SD card, and a DVD.

Only the control lines or information lines that are necessary for the detailed description are shown. All of control lines or information lines in the product are not necessarily shown. Actually, it may be assumed that almost all of the components are mutually connected.

REFERENCE SIGNS LIST

100: data processing device
101: process data
102: threshold configuration GUI
103: threshold configurator
104: network congestion determinator
105: bus priority configurator
106: route switch unit
107: route switch
108: retry counter
109-111: buffer
112-114: PE
115: shared bus
116-118: memory
119: retry counter value
120: bus priority configuration signal
121: processor core
122: network interface
123: memory interface
201: polling timer
202: counter reader
203: determinator
501: packet payload size input section
502: acceptable accumulation size input section
503: effective transmission capacity input section
900: data processing device
1100: data processing device
1101: route switch unit master
1102: route switch master
1204-1206: additional buffer
1400: data processing device
1402: threshold configuration GUI
1403: threshold configurator
1501: network buffer size display section
1502: packet payload size display section
1503: effective transmission capacity input section
1700: data processing device
1705: load balance configurator
1706: route switch unit
1707: route switch
1709-1711: buffer
1712-1714: PE
1716-1718: memory
1724: load balance instruction master signal
1725: load balance instruction slave signal
1900: semiconductor external view inspection device
1: XY stage
7: light source
6: condenser lens
2: wafer
4: objective lens
5: image sensor
10: analog image information
11: A/D converter
12: digital image information
1901: image data distribution controller
2000: distribution control table
2300: semiconductor external view inspection device
2303: image data distribution buffer usage signal
2301: image data distribution buffer memory
2302: image data distribution send controller
2304: network congestion determinator
2403: determinator
2404: determination OR unit

The invention claimed is:

1. A data processing device comprising:
a buffer that temporarily stores data;
a processor element that receives the data from the buffer to process it;
a congestion determinator that determines a congestion level of a bus in the processor element; and
a buffer accumulation suppressor that suppresses, according to said congestion level determination of the congestion determinator, an increase in a data amount stored in the buffer,
wherein the processor element comprises
a data input unit that receives data;
a data output unit that outputs data;
a processor core that processes data; and said bus, wherein the bus is shared for communication between the data input unit, the data output unit, and the processor core, wherein when data transmission from the buffer to the processor element occurs, if the data input unit cannot receive data from the buffer due to congestion of the bus, the data input unit sends to the buffer a retransmission request requesting to resend the non-received data, wherein the congestion determinator determines the congestion level of the bus based on whether a number of the retransmission requests that have occurred within a predetermined duration exceeds a predetermined retry counter upper limit, and wherein if the congestion determinator determines that the number of the retransmission requests that have occurred within the predetermined duration exceeds the predetermined retry counter upper limit, the buffer accumulation suppressor suppresses the increase in the data amount stored in the buffer.

2. The data processing device according to claim 1, wherein if the congestion determinator determines that the number of the retransmission requests that have occurred within the predetermined duration exceeds the predetermined retry counter upper limit, the buffer accumulation suppressor sends to the processor element a priority configuration instruction configuring a priority of the bus such that the processor element can receive the data from the buffer, and wherein the processor core, when receiving the priority configuration instruction, performs a temporary bus interruption of a process occupying the bus to release the bus, thereby allowing the processor element to receive the data from the buffer.

3. The data processing device according to claim 2, wherein the data processing device further comprises a threshold configurator that configures the retry counter upper limit and a time for continuing the temporal temporary bus interruption, wherein the threshold configurator receives a packet payload size of the data, an acceptable accumulation size specifying a data size that is allowed to be accumulated in the buffer, and a specified value for a maximum data input speed when the data is inputted into the data processing device, wherein the threshold configurator calculates the retry counter upper limit based on an acceptable accumulation size and the packet payload size, and wherein the threshold configurator calculates the time for continuing the temporary bus interruption based on the acceptable accumulation size and the maximum data input speed.

4. The data processing device according to claim 3, wherein the threshold configurator presents on a display device a user interface for inputting the packet payload size of the data, the acceptable accumulation size specifying a data size that is allowed to be accumulated in the buffer, and the specified value for a maximum data input speed when the data is inputted into the data processing device, and wherein the threshold configurator receives values inputted on the user interface.

5. The data processing device according to claim 1, further comprising:
a plurality of said processor elements;
a plurality of said buffers each of which correspond to one said processor element; and
a route switch unit that distributes the data to one of the processor elements, wherein the congestion determinator performs the determination for each of said buffer, and wherein the buffer accumulation suppressor sends to each said processor element a priority configuration instruction configuring a priority of the bus so that each said processor element can receive the data from the buffer, thereby suppressing an increase in the data amount stored in each said buffer.

6. The data processing device according to claim 5, further comprising:
a threshold configurator that configures the retry counter upper limit and a time for continuing the temporary bus interruption, wherein the route switch unit comprises a storage unit that stores a packet payload size of the data and an acceptable accumulation size specifying a data size that is allowed to be accumulated in the buffer, wherein the threshold configurator receives a specified value for a maximum data input speed when the data is inputted into the data processing device, wherein the threshold configurator reads out the acceptable accumulation size and the packet payload size from the storage unit, wherein the threshold configurator calculates the retry counter upper limit according to the acceptable accumulation size and the packet payload size, and wherein the threshold configurator calculates the time for continuing the temporary bus interruption based on the acceptable accumulation size and the maximum data input speed.

7. The data processing device according to claim 1, further comprising:
a first processor cluster including a first plurality of said processor elements;
a first route switch unit that distributes the data to one said processor element in the first processor cluster;
a second processor cluster including a second plurality of said processor elements; and
a second route switch unit that distributes the data to one said processor element in the second processor cluster;

wherein the congestion determinator performs the determination for each of the processor elements in the first and second processor clusters, and wherein if the congestion determinator determines that the number of the retransmission requests that have occurred within the predetermined duration exceeds the retry counter upper limit, the buffer accumulation suppressor distributes the data to one of the first and second route switch units.

8. The data processing device according to claim 1, wherein the congestion determinator compares a number of the retransmission requests that have occurred for a same data within a predetermined duration, with the retry counter upper limit that is calculated by dividing a data amount allowed to be accumulated in the buffer by a packet payload amount, and wherein the congestion determinator determines whether the number of the retransmission requests that have occurred within the predetermined duration exceeds the retry counter upper limit.

9. A semiconductor external view inspection device comprising:
a buffer that temporarily stores data;
a processor element that receives the data from the buffer to process it;

a congestion determinator that determines a congestion level of a bus in the processor element;

a buffer accumulation suppressor that suppresses, according to said congestion level determination of the congestion determinator an increase in a data amount stored in the buffer; and an image sensor that acquires an external image of a semiconductor as image data, wherein the data processing device processes the image data, wherein the processor element comprises
a data input unit that receives data;
a data output unit that outputs data;
a processor core that processes data; and
said bus, wherein the bus is shared for communication between the data input unit, the data output unit, and the processor core, wherein when data transmission from the buffer to the processor element occurs, of the data input unit cannot receive data from the buffer due to congestion of the bus, the data input unit sends to the buffer a retransmission request requesting to resend the non-received data, wherein the congestion determinator determines the congestion level of the bus based on whether a number of the retransmission requests that have occurred within a predetermined duration exceeds a predetermined retry counter upper limit, and wherein if the congestion determinator determines that the number of the retransmission requests that have occurred within the predetermined duration exceeds the predetermined retry counter upper limit, the buffer accumulation suppressor suppresses the increase in the data amount stored in the buffer.

10. The semiconductor external view inspection device according to claim 9, further comprising:
a plurality of said processor elements;
a plurality of said buffers each of which correspond to one said processor element; and
a route switch unit that distributes the data to one of the processor elements,
wherein the congestion determinator performs the determination for each said buffer,
wherein the buffer accumulation suppressor suppresses an increase in a data amount stored in each said buffer, and
wherein the semiconductor external view inspection device further comprises a distribution controller that instructs the route switch unit as to which processor element to distribute the image data.

11. The semiconductor external view inspection device according to claim 10, wherein the distribution controller comprises a distribution buffer that temporarily stores the image data, wherein the distribution controller determines whether a data amount stored in the distribution buffer is equal to or greater than an acceptable accumulation size which the image data is allowed to be accumulated in the distribution buffer, and wherein if the congestion determinator determines that the number of the retransmission requests that have occurred within the predetermined duration exceeds the predetermined retry counter upper limit, or if the distribution controller determines that a data amount stored in the distribution buffer equals the acceptable accumulation size, the buffer accumulation suppressor suppresses an increase in the data amount stored in the buffer.

12. A method for suppressing an increase in a data amount stored in a buffer included in a data processing device including
a buffer that temporarily stores data; and
a processor element that receives the data from the buffer to process it,
the processor element including
a data input unit that receives data;
a data output unit that outputs data;
a processor core that processes data; and
a bus that is shared for communication between the data input unit, the data output unit, and the processor core,
the method comprising:
sending to the buffer from the data input unit a retransmission request requesting to resend non-received data, when data transmission from the buffer to the processor element occurs, if the data input unit cannot receive the data from the buffer due to congestion of the bus;
determining a congestion level of said bus in the processor element; and
based on said congestion determination step, an increase in a data amount stored in the buffer,
wherein the congestion determination step comprises determining a congestion level of the bus according to whether a number of the retransmission requests that have occurred within a predetermined duration exceeds a predetermined retry counter upper limit, and
wherein the buffer accumulation suppressing step comprises, if the congestion determination step determines that the number of the retransmission requests that have occurred within the predetermined duration exceeds the retry counter upper limit, suppressing an increase in the data amount stored in the buffer.

\* \* \* \* \*